Feb. 25, 1969  J. L. PATRICK  3,430,036
MULTIPHASE CLOCK CONTROL SYSTEM FOR MACHINE TOOLS
Filed Sept. 7, 1965  Sheet 1 of 17

WITNESSES
John L. Chopp
Bernard R. Gieguay

INVENTOR
John L. Patrick
BY E. F. Possessky
ATTORNEY

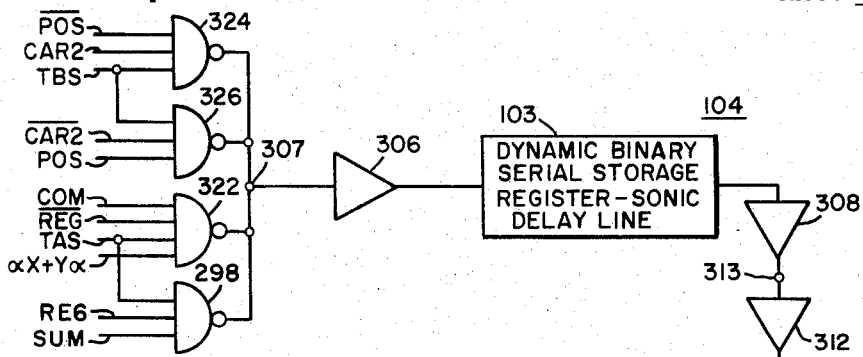
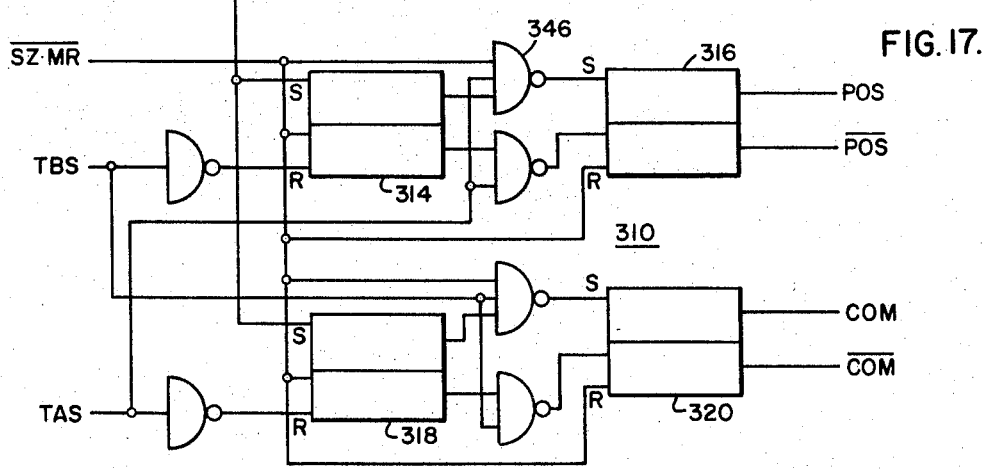
FIG. 17.
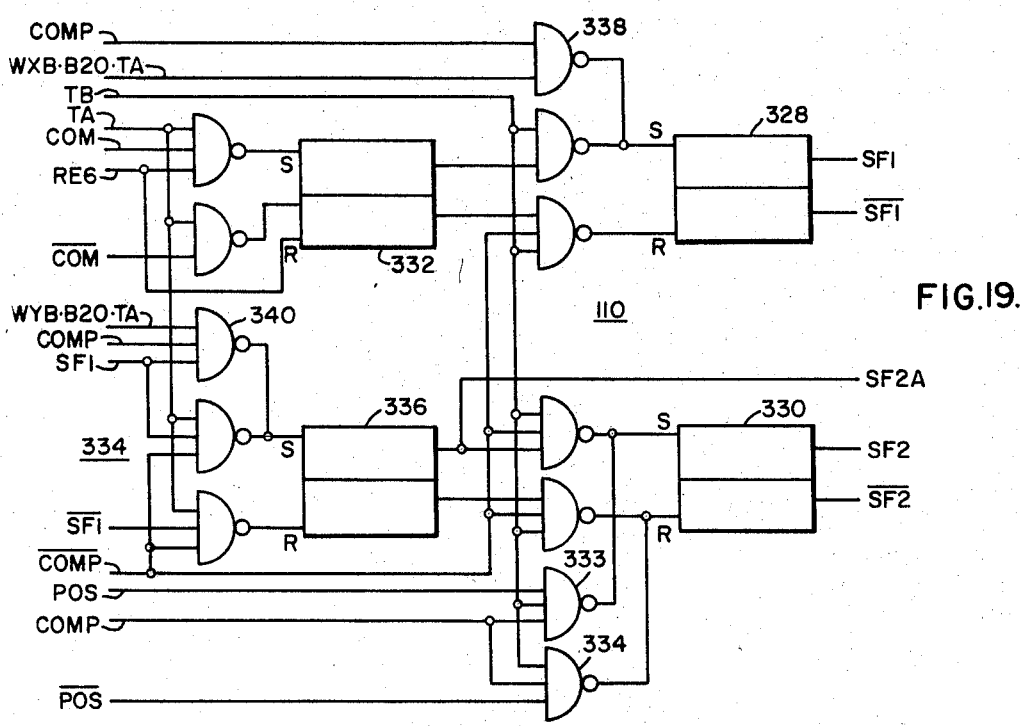
FIG. 19.

United States Patent Office 3,430,036
Patented Feb. 25, 1969

3,430,036
MULTIPHASE CLOCK CONTROL SYSTEM
FOR MACHINE TOOLS
John L. Patrick, Laurel, Md., assignor to Westinghouse
Electric Corporation, Pittsburgh, Pa., a corporation of
Pennsylvania
Filed Sept. 7, 1965, Ser. No. 485,373
U.S. Cl. 235—151.11                                      19 Claims
Int. Cl. G06f 15/46; G06g 7/64

The present invention relates to control systems for machine tools and more particularly to numerical point-to-point positioning control systems for machine tools which produce drilling, punching, milling and other similar operations.

Numerical control has been used to advantage in automating the operation of machine tools particularly where a machining pattern is to be repeated on successive workpieces. In some cases, numerical control is used to produce controlled contour machining in which the tool is operated along two or three dimensional paths to produce predetermined machine work under continuous control. The present invention relates primarily to point-to-point positioning machine tool control systems in which discrete machining operations are performed at successive points on the workpiece, and the particular path followed by the tool between the work points is unimportant since no work is performed on the workpiece in the interpoint space. However, a point-to-point position machine tool control often can be operated to produce some forms of path or contour machining such as straight line milling, and the line of division between the two types of machine controls thus does not make an absolute partition.

In a point-to-point position control system, stored command data defining the sequential machining operations is made available in an input device of predetermined type. For example, the data can be stored on magnetic or paper tape or on punched cards in the form of coded characters and digits in binary or other code form. The system input then comprises a tape or card reader and input logic circuitry for processing the input data into a form required for use in controlling the machine operation.

The command data identifies the machining operations and prescribes the locations at which they are to be performed. The control system includes a motor drive arrangement which positions the tool head or the workpiece in accordance with processed position commands and further includes suitable logic and drive circuitry to initiate and complete the tool operation defined for each location. Position command data, hereinafter termed command data for convenience, can be stored statically or dynamically in a register, and an error detector controls the output drive in response to differences between command and feedback position data.

All machine tool functions other than position control may be termed auxiliary functions and vary from machine to machine according to the machine tool design and according to the user's needs. For example, four spindles with four different drill sizes may be provided in a simple drilling machine subject to position control along two axes. The spindles may operate with different rotation and feed speeds and the auxiliary functions can be set to control the particular drill and the character of the drilling to be performed at each programmed workpiece location.

By a two-axis position control, it is meant to refer to a machine in which workpiece location is specified along each of two axes or coordinates of a reference plane. A control designed for three or more axes may be used where workpiece location is specified along each of three coordinates either in a single reference plane or within a reference solid. Theoretically, a machine tool control system can be arranged to control tool or workpiece movement along as many axes as desired and in practice as many as six or seven or more axes are used. The particular system devised for controlling one number of reference axes can often be programmed or modified by artisan variation to control another number of reference axes.

There are various factors used to assess the value of the machine control performance produced by a particular machine tool control system. The primary ones are program capacity, reliability, speed, accuracy and manufacturing and use costs. The system combination used in any particular machine tool control and the dynamic interaction among the system elements are determinative of the overall machine control utility when these measuring standards are used.

In accordance with the general principles of the present invention, a plural-axis numerical machine tool control system comprises an input data processing system which registers multi-axis command data in an economic dynamic binary serial storage register where it is circulated at least until the tool or workpiece is positioned in conformity with the command. A feedback system generates actual position data for storage in the register and for comparison with the command data to generate an error signal.

A multiphase clock is employed in conjunction with various subsystems to control electronically the processing and registration of command and position data for each machine axis. Auxiliary functions are performed by suitable logic and drive circuits as the machine is cyclically operated from position to position according to the input program.

Preferably, molecular logic circuits are employed in most or all of the low power logic circuitry, and NAND logic is preferably employed for most logic functions. Since NAND logic circuits operate on the leading edge of gating pulses, separate clock phases can be advantageously employed to gate successive NAND logic stages. The overall system provides improvement in numerical machine tool control as measured by the standards previously described.

It is therefore an object of the invention to provide a novel and improved numerical machine tool control system which operates with reliability, accuracy and speed.

An additional object of the invention is to provide a novel and improved numerical machine tool control system which is economic to manufacture and use.

Another object of the invention is to provide a novel and improved numerical machine tool control system which has a relatively large program capacity with fast logic circuitry packaged in a comparatively small volume.

A further object of the invention is to provide a novel and improved numerical machine tool control system in which the data processing logic can be operated without external cooling and therefore can be economically isolated in the control package so as substantially to eliminate operational noise problems.

It is another object of the invention to provide a novel and improved point-to-point positioning numerical machine tool control system in which a multiphase clock system is economically combined with molecular and other circuitry to produce fast, accurate and reliable logic processing of command and position data and overall improvement in machine tool control performance.

These and other objects of the invention will become more apparent upon consideration of the following detailed description along with the attached drawings, in which:

FIG. 4A shows a schematic data flow diagram for a read in cycle of the control system operation;

FIG. 4B shows a schematic data flow diagram for a comparison cycle of the control system operation;

FIG. 17 shows a schematic diagram of a preferred circuit for a command and position data storage unit employed in the control system;

FIG. 19 shows a schematic diagram of a preferred circuit for a shift register employed in the control system;

Figure 1:
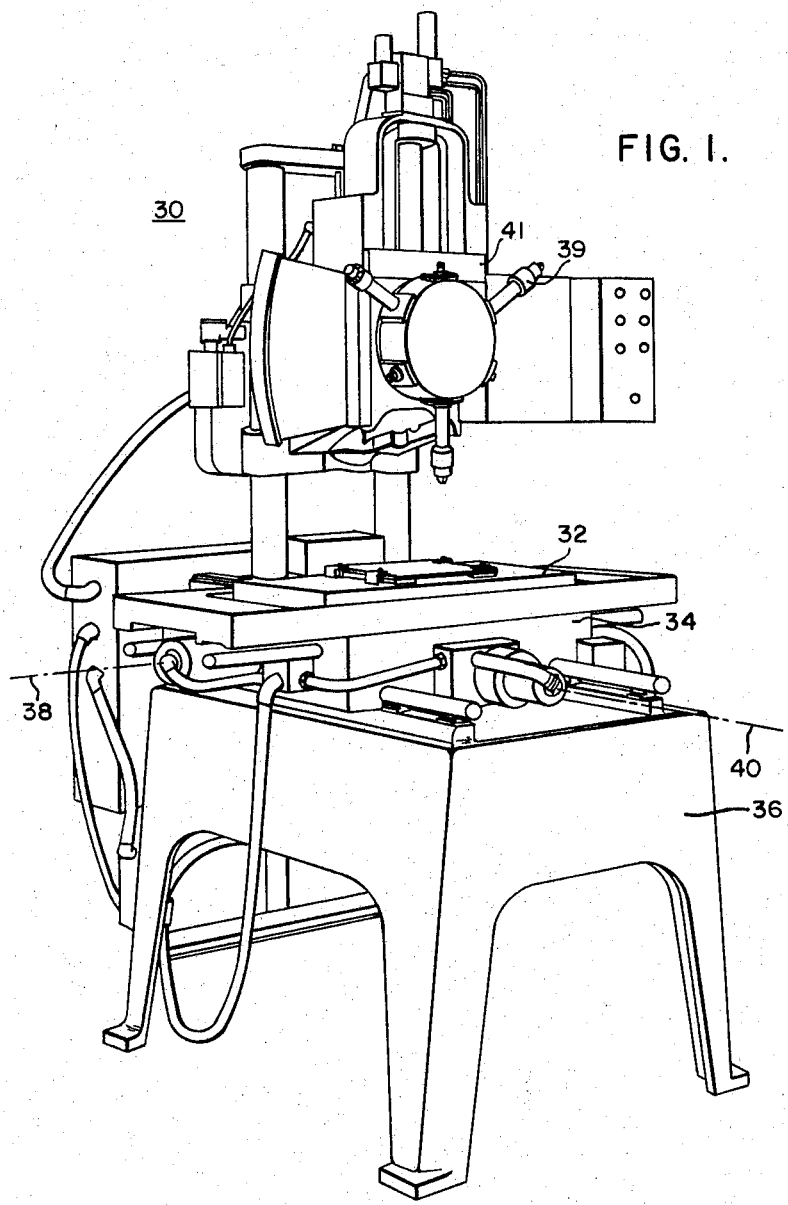
FIGURE 1 shows a multiple spindle drilling machine which can be numerically controlled in accordance with the principles of the invention.

More specifically, in FIG. 1 there is shown an example of a machine tool 30 which is subjected to two-axis position control and auxiliary function control in accordance with the principles of the invention. It is a multiple spindle turret drilling machine which is operable to perform successive single drilling operations. Accordingly, the machine 30 includes a work table 32 which is supported in a way on a carriage 34 for sliding movement along a first or X axis. The carriage 34 in turn is supported in a way on a base 36 for sliding movement along another or Y axis. The table 32 and the carriage 34 are driven by lead screws located along the reference axes indicated by the reference characters 38 and 40. The lead screws in turn are driven by suitable X and Y motor drives as subsequently considered more fully. The combined movement of the movable table and carriage members results in placement of a workpiece point at any desired point in a reference XY plane within the bounds of table and carriage movement.

Figure 2:
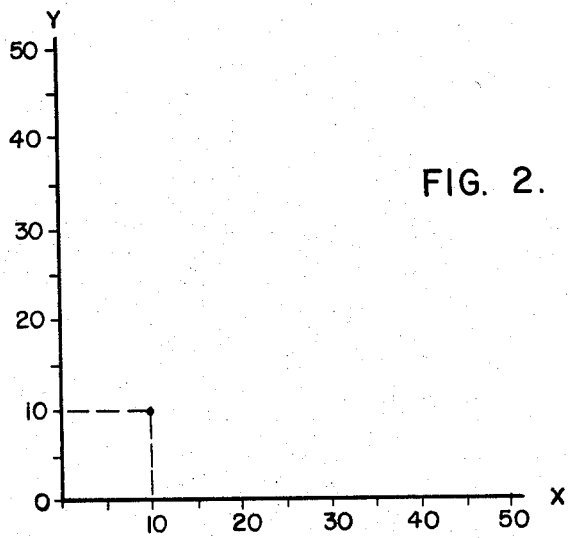
FIG. 2 shows an XY reference plane along which a workpiece is positioned for machining operations.

The XY reference plane is schematically shown in FIG. 2. When a workpiece is clamped to the table 32 and oriented in relation to the XY zero point, the table can be moved for drilling operations at various coordinate points on the workpiece. The workpiece is subjected to point-to-point positioning control, that is the path between drilling points is not generally defined by control although the drilling points are precisely set. Tool selection by rotation of spindles 39, spindle speed, feed rate of tool head 41 and other auxiliary variables are controlled to follow the drilling program set for any particular workpiece.

I. A GENERAL OVERVIEW OF THE NUMERICAL CONTROL SYSTEM

Figure 3:
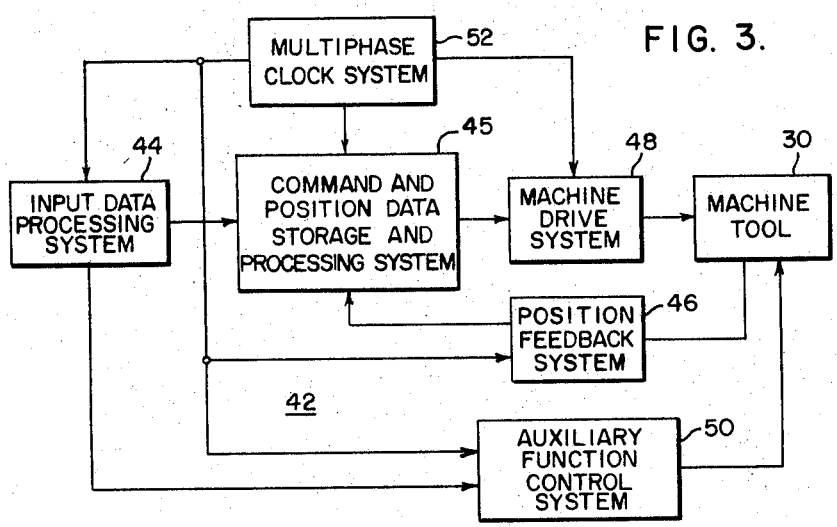
FIG. 3 shows a general block diagram of a multiphase clock control system for numerically controlling machine tools in accordance with the principles of the invention.

In FIG. 3, there is shown a block diagram generally descriptive of the operation of a numerical machine tool control system 42 in accordance with the principles of the invention. For each axis under control, an input digital data processing system 44 generates a set of command data which is written as a time series binary number in a command and position data storage and processing system where it is stored and compared with a time series binary position feedback number generated through the operation of a digital position feedback system 46.

A machine drive system 48 responds to generated binary error numbers associated with the axes under control and drives the machine 30 until there is zero error between the associated command and position numbers. The cycle is repeated when new command numbers are entered into the system 42. Auxiliary machine functions are controlled by a control system 50 in response to data transmitted thereto from the input data processing system 44.

A multiphase clock system 52 generates clock pulses in separate phases and cyclically counts the pulses to gate or otherwise electronically control the processing, circulation and comparison of command and position data in the command and position data storage and processing system 45. The clock system 52 also gates or controls the input data processing system 44 so that input command data is synchronously admitted in proper form into the command and position data storage and processing system 45. Preferably, the clock system 52 also is employed to control the speed with which the machine drive system 48 drives position error to zero in accordance with the size of the error. It also provides some gating functions in the auxiliary function control system 50. The described interacting system elements provide overall improvement in numerical machine tool control performance especially when molecular blocks are employed in the low power logic circuitry.

II. A MORE ELEMENTAL SURVEY OF THE NUMERICAL CONTROL SYSTEM

Figure 4:
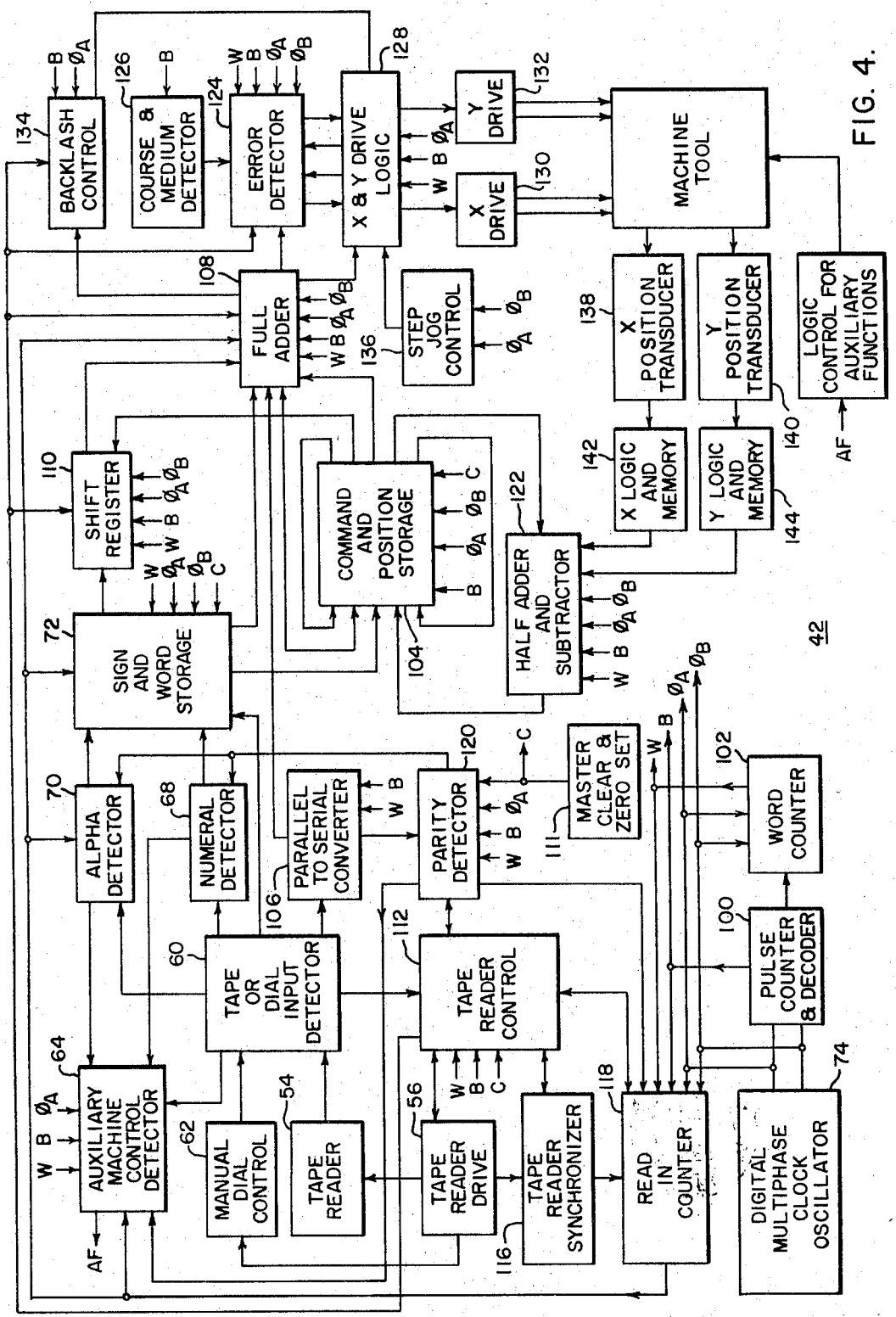
FIG. 4 shows a more specific block diagram of the multiphase clock control system.

In FIG. 4, the control system 42 is shown in greater block detail in its preferred form. In both FIGS. 3 and 4, the block boundaries and interconnections are essentially correct, but, as is usually the case in generalizing to obtain simplified schematic designations, some details of interconnection and subsystem delineation are not precisely represented.

A. *Tape reading—An instructional process for the machine tool*

In the preferred embodiment, input data is stored on punched paper tape, and the tape is transported through a suitable commercially available tape reader 54 in response to a tape reader drive 56. Generally, the tape reader drive 56 produces successive pulses during a tape read cycle, and each pulse operates the tape reader 54 to advance the tape a distance of one data line.

B. *Tape—Its code and character*

Figure 16:
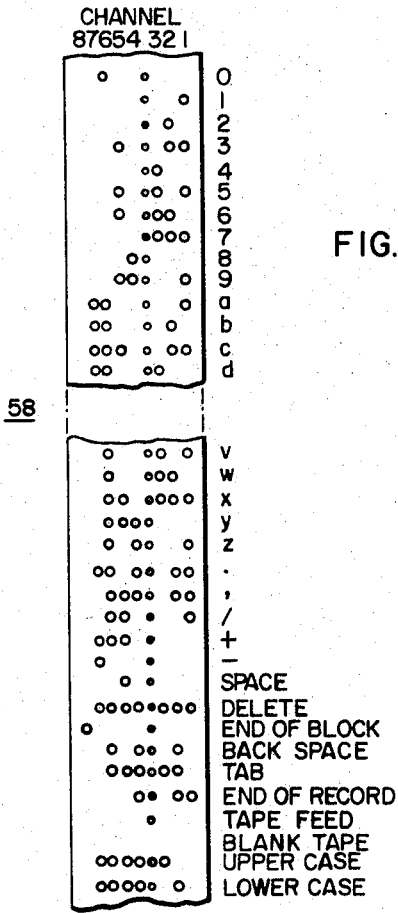
FIG. 16 shows a sample piece of paper tape and a sample code employed in one embodiment of the invention.

A sample piece 58 of standard one inch paper tape is shown in FIG. 16. On the sample 58, there is shown between channels 3 and 4 a continuous series of sprocket holes used to advance the tape. Eight data channels CH1 through CH8 are shown for use in recording one coded character per lateral row. Each of the numeric and alphabetic and other characters to be used in programming the position and the auxiliary function commands is in this instance provided with a binary code. A portion of a sample set of commands is shown with the corresponding binary code designation for each command.

In the sample code, digits 0 thorugh 9 are used to specify decimal numeric position command absolute in relation to set zero, and the digits 1–9 are binary coded by holes in CH1–CH4 corresponding to the respective binary number notations. Hence, the digit one is "1," the digit two is "10," etc. Zero is indicated by a single hole punched in CH6.

Various combinations of punched holes are used for alphabetic letters. In the system 42, only M, F, S and T are used to define auxiliary machine functions but additional characters can be used if desired. Alpha characters X and Y define the machine axis to which numeric position data pertains. Any one position command and corresponding auxiliary function commands require a block of successive predetermined lines of tape data, and C*H*8 is used to indicate the start and end of successive data blocks.

A program is predetermined for successive operations to be performed by the machine tool 30, and the program is code punched in successive tape rows and tape blocks on a continuous length of tape. As each data row is advanced to the tape read position tape reader feeler contact pins (not shown) complete various circuits through the punched holes in that row. An input detector 60 (FIG. 4) of conventional circuit design produces a separate amplified and filtered output for each of the tape channels having a punched hole in the tape row being read. A suitable manual dial control 62 can be used in place of the tape reader 54, and the detector 60 operates in a similar manner with it.

As an example of a tape data block, the first row after an end of block character may contain the code for X indicating that X-axis position coded decimal digits are to follow, the next row may be coded with a plus or minus character, and successive rows may be coded with digits 10824, most significant digit first. The Y character can be coded in the next row to indicate Y-axis position coded decimal digits are to follow, and the sign character and coded decimal digits representing the Y position command are then entered in successibe tape rows. The required auxiliary function characters are then entered in the following rows, and the last block row contains the end of block character CH8.

Suitable logic circuitry is employed in an auxiliary machine control detector 64 to detect command information requiring the performance of auxiliary functions. In turn, a suitable logic control 66 responds to the detected auxiliary commands and actuates or drives the machine tool 30 at appropriate times to perform the auxiliary functions. For example, spindle selection may be made during the work positioning period and immediately upon completion of that period the head 41 can be advanced at a particular feed rate to perform a drilling operation. When the drilling operation is completed, the head 41 is retracted in preparation for the next work position command.

C. *Address register—A director for input data*

Since each block of tape data contains various types of commands, an address register is provided in the input data processing system 44 to store key data bits in memory for use as gating signals at appropriate addresses as the input data flow proceeds. The address register comprises a numeric detector 68 and an alpha detector 70 which are formed from suitable logic circuitry to detect whether successive characters recorded in the tape input detector 60 are numeric or alpha characters. Logic use is made of the outputs from the numeric and alpha detectors 68 and 70 in the auxiliary machine control detector 64 and in another address register component, a sign and X and Y word storage unit 72. Sign characters are detected by the unit 72 and stored with the X and Y word characters for control and gating use at appropriate address locations in the interval of time during which numeric command data is being registered in the control system 42.

D. *Multiphase clock—The data processing timekeeper and system coordinator*

Figure 5:
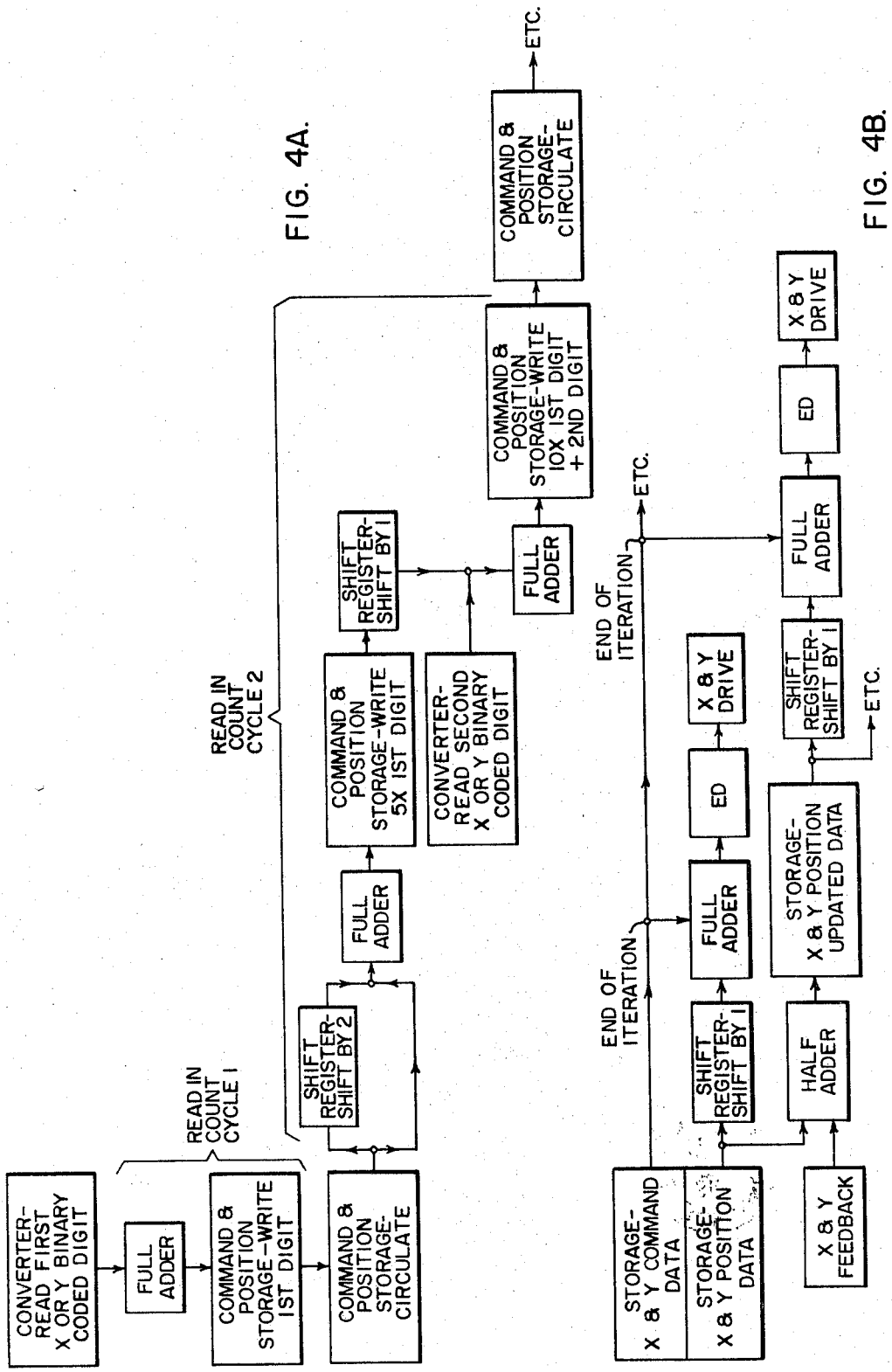
FIG. 5 shows an exemplary embodiment of the multiphase clock.
Figure 6:
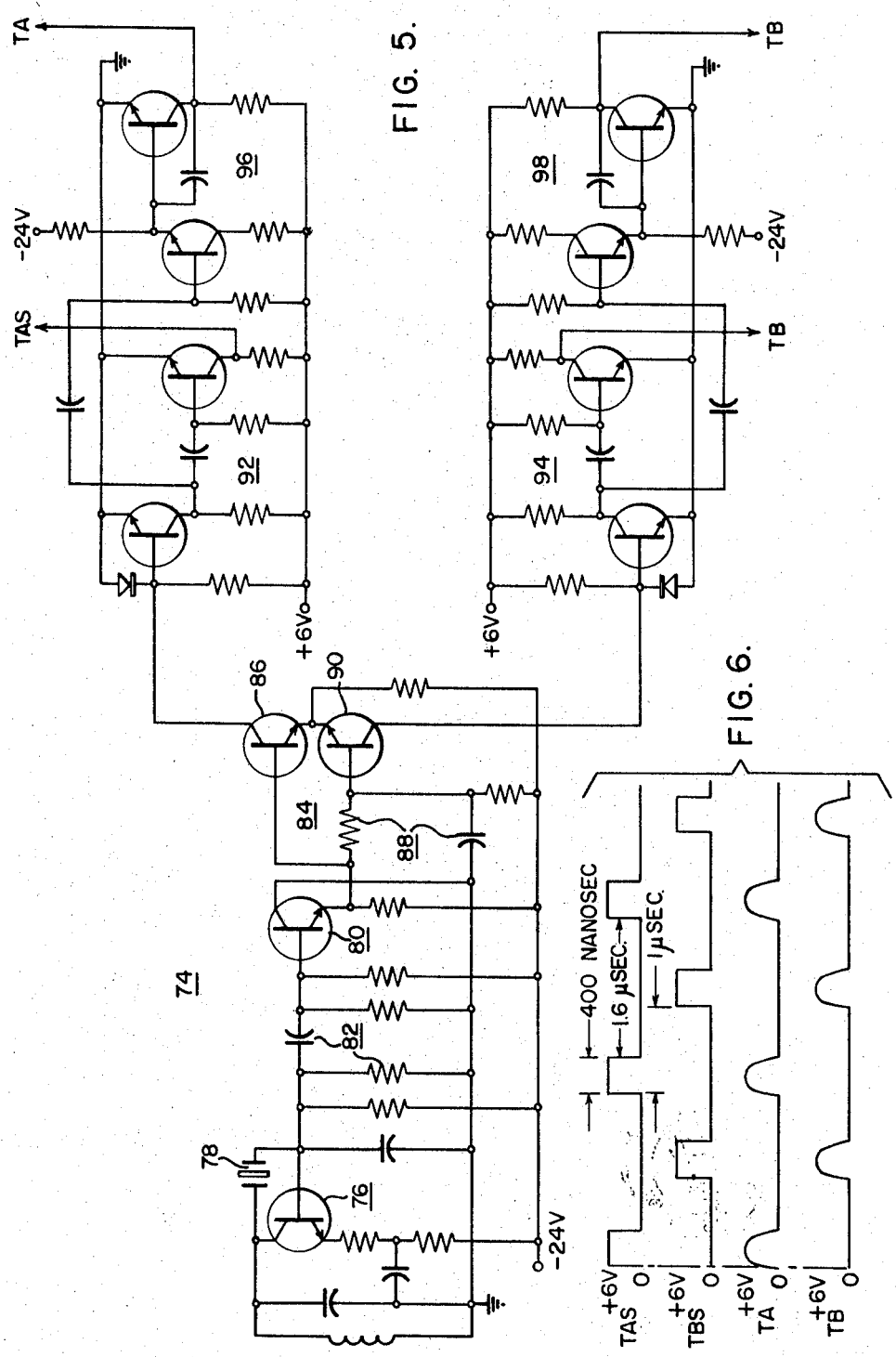
FIG. 6 shows the pulse trains of a plurality of clock outputs.

The multiphase clock system 52 comprises a conventional digital multiphase crystal clock oscillator 74. An illustrative clock example is shown in FIG. 5. Preferably, it is arranged to produce a two phase output of clock pulses TA, TAS and TB, TBS as shown in FIG. 6. The clock pulses are used at various system points to provide logic gating in the clock phase time in which various predetermined logic events are to occur. The clock pulses are counted to identify time periods during which various predetermined data flow processes are completed.

The clock oscillator 74 includes a standard Colpitts transistor sine wave crystal oscillator 76 which includes a 500 kc./sec. quartz crystal 78. The output from the oscillator 76 is coupled to a transistor amplifier 80 through a coupling network 82. The amplified output is fed to a phase splitter 84 which provides a phase A channel through transistor 86 and a phase B channel through a phase shift network 88 and a transistor 90. In the respective phase channels, the transistor outputs are shaped by shaping circuits 92 and 94 to produce the pulses TAS and TBS and by shaping circuits 96 and 98 to produce the pulses TA and TB. The clock pulses TAS and TBS have a sharp rise and fall time for use in registering data, and the clock pulses TA and TB have a generally rounded configuration so as to reduce voltage spikes and electrical noise where used elsewhere in the logic circuitry. The clock frequency of 500 kc./sec. or 1 million pulses per second can vary due to ambient or other variables, but normal frequency variations have no effect on system operation as will subsequently become more apparent.

E. *The clock counting function*

Figure 10:
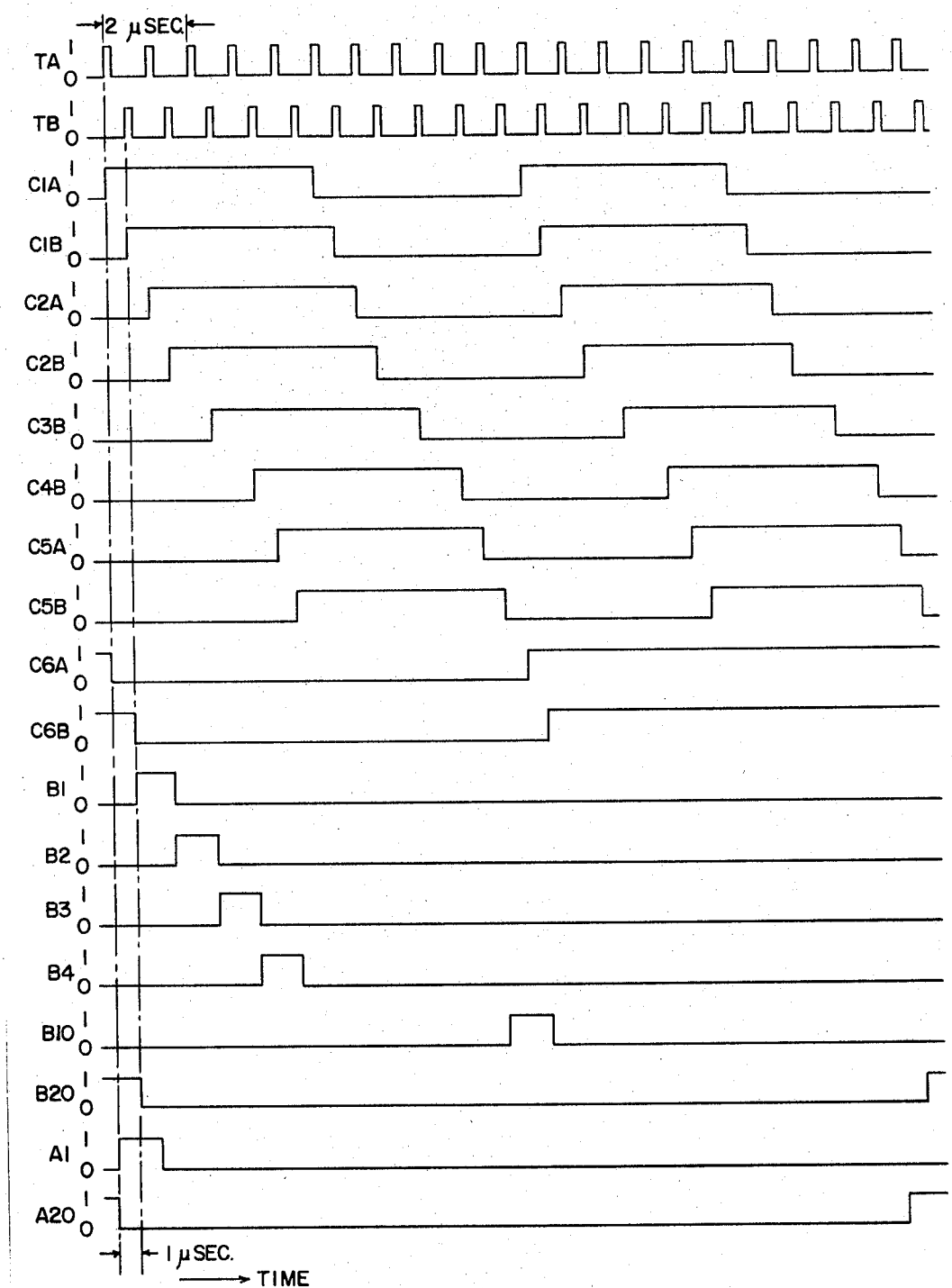
FIG. 10 shows certain outputs from the multiphase clock and the decoder.
Figure 26:
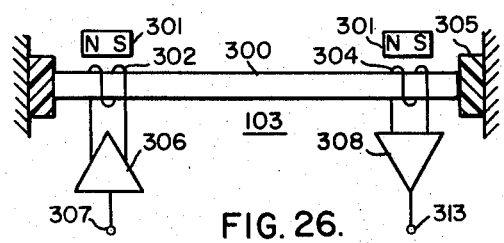
FIG. 26 shows a schematic diagram of a dynamic binary serial storage register in the preferred form of a sonic delay line.
Figure 23:
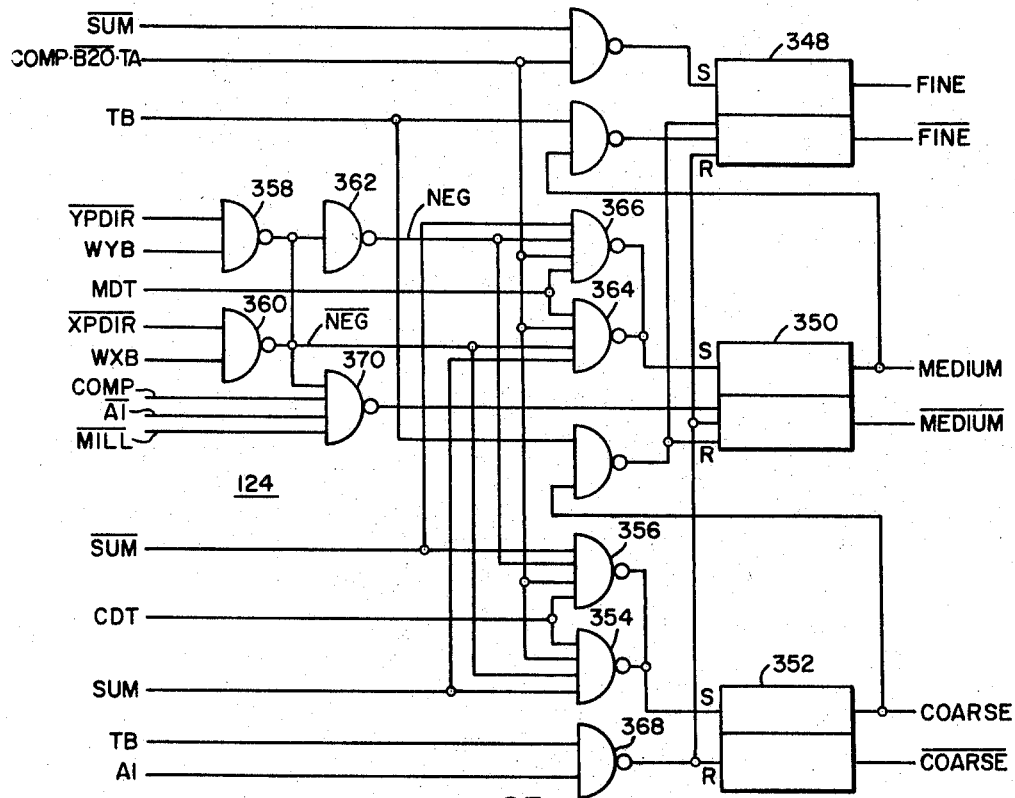
FIG. 23 shows a schematic diagram of a preferred circuit for an error detector employed in the control system.

A pulse counter and decoder 100 and a word counter 102 are included in the clock system 52 to count the clock pulses TA and TB on a cyclical basis and to produce signal outputs for use in precisely identifying certain spans of time in the count cycle for data processing logic events to occur. The counting system is arranged to undergo successive cycles or iterations as it counts the continuously generated clock pulses, and in each iteration a sufficient number of clock pulses are counted to allow clocked time series registration of all of the binary command and position numeric and sign data in a dynamic binary serial storage register 103 (FIG. 26) of a command and position storage unit 104 (FIG. 4). Each iteration is serially divided into word times corresponding in number to the number of position axes under control. Each word time is further subdivided into phase overlapping bit times with each bit time corresponding to the time period between the leading edges of successive clock pulses of the same phase (FIG. 10).

In this particular case, the word counter 102 cycles through two states in each iteration, and the pulse counter cycles through twenty states in each word counter state. The word counter states identify X and Y position word times, and the pulse counter states, when decoded, identify twenty successive bit times associated with each of the two clock phases in each word time.

A data bit can be registered during each clock pulse time or each bit time, and the plus or minus sign bit and the binary number equivalent of a decimal number as high as ($2^{19}-1$) or 524287 can thus be serially registered in each phase of each word time with successive clock pulse times corresponding to successively higher power binary number places. In both X word time and Y word time, phase A clock pulse times are reserved for command binary data registration and phase B clock pulse times are reserved for feedback position binary data registration. The command and position data bits in each word are thus alternately interlaced in time series in the register 103, with the total storage capacity in the storage unit 104 equal to eighty data bits.

The dynamic binary serial storage register 103 is preferably in the form of a sonic delay line and the delay line 103 and its associated input and output circuitry provide an eighty microsecond registration time to provide storage capacity for the eighty bits at the clock pulse generation rate of one pulse per microsecond. Each iteration is accordingly eighty microseconds long, and the X and Y word times are successively forty microseconds long. Each counter bit time is two microseconds long, and each clock pulse time is approximately four hundred nanoseconds long as shown in FIG. 6. The particular uses made of various word and bit time signals will subsequently become more apparent.

F. *Another input logic step—Conversion of parallel binary coded digits to time series binary coded digits*

Numeric position command information is processed from the tape input detector 60 to a converter 106 where binary coded characters are converted from a time parallel designation to a time series designation, least significant binary bit first. Conventional logic circuitry (not shown) is used for the conversion. Generally, detector channels CH1–CH4 are connected to the converter and the channels are scanned under pulse counter and word counter control to produce a time series binary output during the first four phase B bit times in each word time. The converter output is repeated during each counter iteration while any particular tape data row is located in the read position.

The converter output is transmitted to a full adder 108 which functions both to process command data as it is being read into the command and position storage unit 104 and further subsequently to process all position data in an error detection process. The full adder 108 cooperates with a shift register 110 to process the position and command data during a read in cycle and to process the position data during a comparison cycle. The logic output from the converter 106 can exist for characters other than numeric characters but further processing is rejected since an X or Y word address signal is required for data to be registered in the command and position storage unit 104 and the word address signal is present only when X or Y numeric data is being read.

G. *The read in cycle—Writing the instructions*

Read in control is provided to start and advance the tape read process, to check tape character parity, to synchronize the admission of tape data with the iterations of the digital data processing system since the tape advance rate is asynchronous with the iteration rate, and to provide timed gating control over the processing of command data into the command and position storage unit 104 as will subsequently be more fully described.

After a clear and set zero signal is generated by unit 111 at the start of operations, a tape reader control 112 (FIG. 4) starts the read in cycle and initiates operation of the tape reader drive 56 and a tape reader synchronizer 116. A read in counter 118 responds to the synchronizer 116 and to the two phase clock 74 and the counters 100 and 102 so as repeatedly to count a predetermined number of time periods corresponding to successive iterations and generate corresponding gating signals for use at various points in the input data processing logic circuitry during the read in cycle.

A parity detector 120 is connected to the converter 106 to make a count of holes in each tape data row. Channels CH5–CH8 are scanned with the previously described channels CH1–CH4 in the converter 106 to make the parity count possible. In this case, odd parity is employed for the tape with channel 5 used to make an odd bit (hole) count for each tape data row when required during the tape punching operation. If an even number of holes is detected in any tape row, the parity detector 120 stops the read in cycle by withholding gating signals from various system elements indicated by interconnection with the parity detector 120.

For each tape data row, the read in counter 118 goes through one read in count during which it initiates parity detection and, if the tape data being read is a numeric position command character, gates the data under clock system control from the converter 106 into the full adder 108 and the command and position storage unit 104. Gating signals from the read in counter 118 in successive iterations of successive read in counts control the processing of data in the full adder 108, the command and position unit 104 and the shift register 110 so as to convert the time series binary coded digits of an X or Y command to a pure X or Y binary number.

After the X and Y position binary command numbers have been read into the command and position storage unit 104 from a block of tape data and after all other commands have been read from the block of data, the tape reader control 112 starts a comparison cycle by gating the shift register 110 and the full adder 108 at the end of the last iteration in the read in cycle. Thereafter, stored X and Y command data is continuously circulated on the delay line 103 and compared with X and Y feedback position data in the full adder 108 to produce a time series error number every iteration. The position data is continuously circulated and updated in a circuit loop including the command and position store unit 104 and a half adder and subtractor 122. The tape reader 54 is stopped at the end of the read in cycle and it restarts to proceed through a new read in cycle when the control system 42 is ready to process the next block of tape information.

H. *The comparison cycle—Effecting the position instruction*

Any binary X or Y error number produced in the full adder 108 is coupled to an error detector 124 (FIG. 4) where clock system signals are used to produce a course or medium or fine position X or Y error signal according to the weight of the most significant binary bit in the binary error number. A course and medium detector 126 is interconnected from the pulse counter and decoder 100 to the error detector 124 for logic use in developing the error detector output.

Drive logic circuitry 128 is used to energize separate X and Y motor drive arrangements 130 and 132 in response to the error detector output and corrective X and Y movements occur simultaneously. Preferably, a squirrel cage AC motor (not shown) and a conventional stepping motor (not shown) are belt connected to drive the X axis lead screw and another identical combination of motors are belt connected to drive the Y axis lead screw. Alternatively, a DC motor can be employed to form each motor drive arrangement 130 or 132.

The X or Y step motor is operated at low creep speed when the fine error signal is generated and at high speed when the medium error signal is generated. The X or Y AC motor operates at traverse speed and is energized when the course error signal is generated. The direction of motor drive depends on the sign of the generated error number. Work table and carriage movement can, if desired, be controlled by a suitable gearing and forward and reverse clutching arrangement (not shown). Reference is made to a copending application Ser. No. 494,363, entitled Base Drive Circuit for Voltage-Controlled Transistor Saturable Reactor Oscillator, filed by D. R. Webster and H. D. Ausfresser on Oct. 11, 1965, and now Patent No. 3,332,033, and assigned to the present assignee for a disclosure of a unique variable frequency oscillator preferably employed in controlling the speed at which the stepping motor is operated.

When the X and Y position errors become zero, the motor drives are deenergized. The workpiece position is then precisely set in accordance with the position command and the prescribed machining operation at that location may then be performed.

I. *Miscellaneous position—Drive features*

A backlash control 134 (FIG. 4) is used to direct the drive logic 128 and the drive arrangements 130 and 132 so that backlash is always taken up in the same X direction and the same Y direction. The backlash control 134 becomes operative to produce intentional overshoot only when the direction of movement is not in the backlash takeup direction. Some additional detail on this feature is subsequently presented.

A step jog control 136 (FIG. 4) is provided with suitable logic circuitry for the purpose of controlling the drives 130 and 132 in moving the workpiece one X or Y position increment (such as .001 inch) each time an X or Y step jog relay button or the like is actuated. To effect the step jog operation, the drive is turned on by a contact closure, and the fact of closure is stored in a flip-flop having its output in parallel with the fine error signal output. The drive is turned off when a feedback pulse resets the flip-flop. To repeat, the step-jog command contact has to open and then close again. The step jog-control is useful primarily during setup operations.

J. *The feedback of position—Information*

As the work table 32 is moved in the XY reference plane toward the command position in the point-to-point positioning mode, the position data is generated in the form of pulses by X and Y feedback transducers 138 and 140 (FIG. 4). A pulse is generated for each increment of movement, for example every .001 inch, along the respective X and Y axes. The transducers 138 and 140 are preferably coupled to the X and Y lead screws so as to respond to table movement in the predetermined manner. The electronic resolution of the system is one bit out of ($2^{19}-1$). If the feedback elements generate 1000 pulses for every inch of table travel, the resolution is .001 inch. Electronic resolution in general can be $1 \times 10^{-n}$ inch where $n$ is the power of ten of feedback pulses per inch of table travel.

When the machine X and Y zero is set at the start of machine operation by the set zero unit 111, all position data is cleared from the delay line 103 and binary position X and Y zero numbers are registered. As the work table 32 is moved to its first command position, feedback pulses update the X and Y position numbers until they conform to the X and Y command numbers when the command is completed. Thereafter, unless subsequently cleared, feedback pulses add to or subtract from the pre-existing X and Y position numbers on the delay line 103 as the machine moves from command position to command position.

The transducers 138 and 140 are preferably photoelectric devices (not shown), and each transducer 138 or 140 generates successive reference and quadrature pulses so that X and Y logic and feedback pulse memory circuits 142 and 144 can distinguish the occurrence and direction of incremental table movement. The X and Y feedback pulses are stored for addition with or subtraction from the previous X and Y position numbers depending on the direction of the incremental movement along each axis. The half adder and subtractor 122 is capable of performing the binary arithmetic each time the position numbers are recirculated on the delay line 103. New X and Y position numbers each updated by one position bit can thus be entered onto the delay line 103 during X and Y word times for every iteration.

The X and Y memories 142 and 144 are reset after use so as to be ready to accept the next X and Y feedback pulses for memory. The delay line iterations occur at a much faster rate than the rate at which X and Y feedback pulses are generated, and any X or Y feedback pulse is therefore stored and removed from storage before a new one is generated.

III. GREATER DETAIL—THE DYNAMIC INTERRELATIONSHIPS AMONG THE SYSTEM PARTS AND THE COORDINATIVE ROLE PLAYED BY THE MULTIPHASE CLOCK SYSTEM

The control system 42 has to this point been described largely in terms of functional units. Specific preferred circuits for the more operationally significant functional units will now be considered so as to clarify the system principles of the invention and establish the connection between the structural and functional character of the control system 42 and improved machine tool control performance. The multiphase clock system 52 is central to the system scheme since it places important controls on the system functional units in the logic processing of command and position data during various predetermined clock pulse times, counter bit times, and word counter times.

Figure 7:
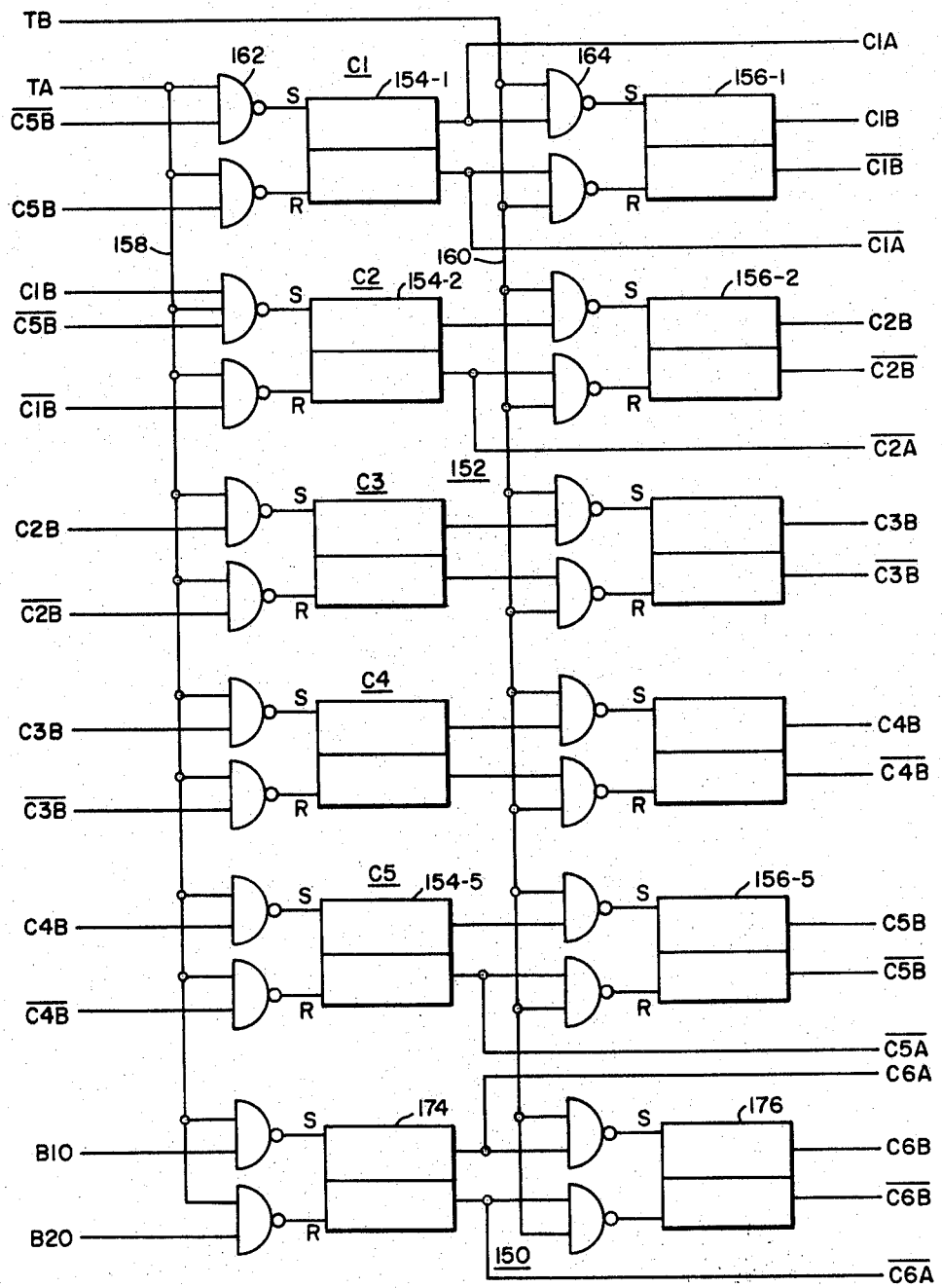
FIG. 7 shows a schematic circuit diagram of a counter which counts the clock pulses.
Figure 8:
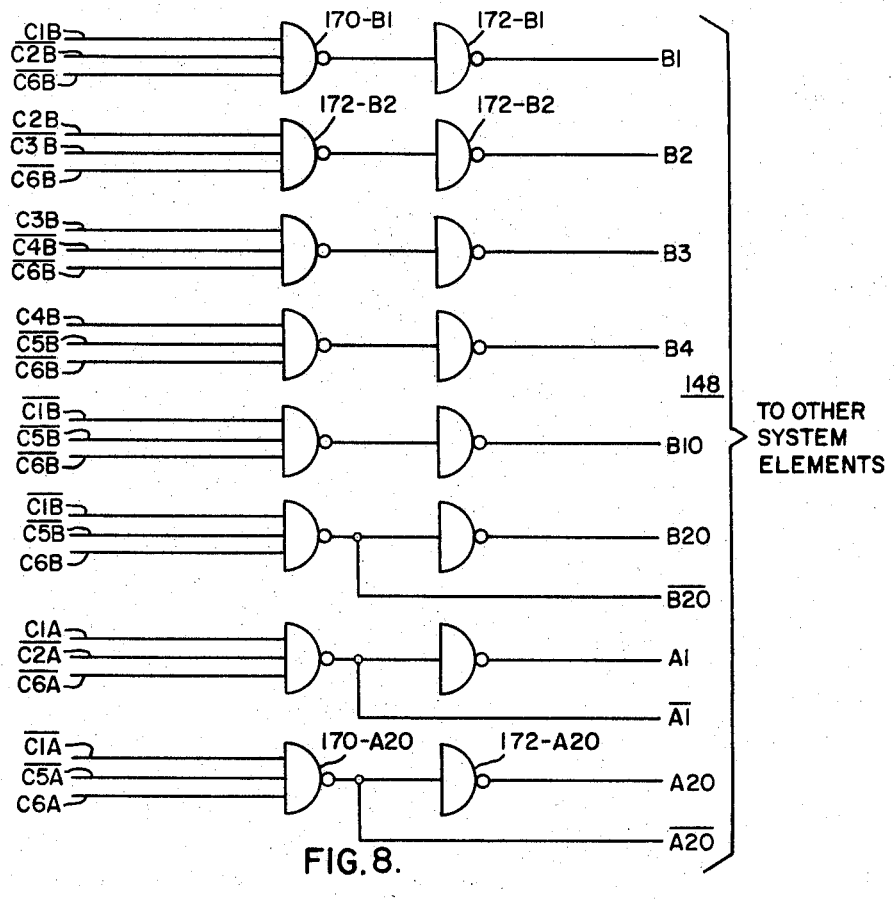
FIG. 8 shows a schematic circuit diagram of a pulse decoder which identifies certain bit times as the pulse counter cyclically counts the clock pulses.
Figure 9:
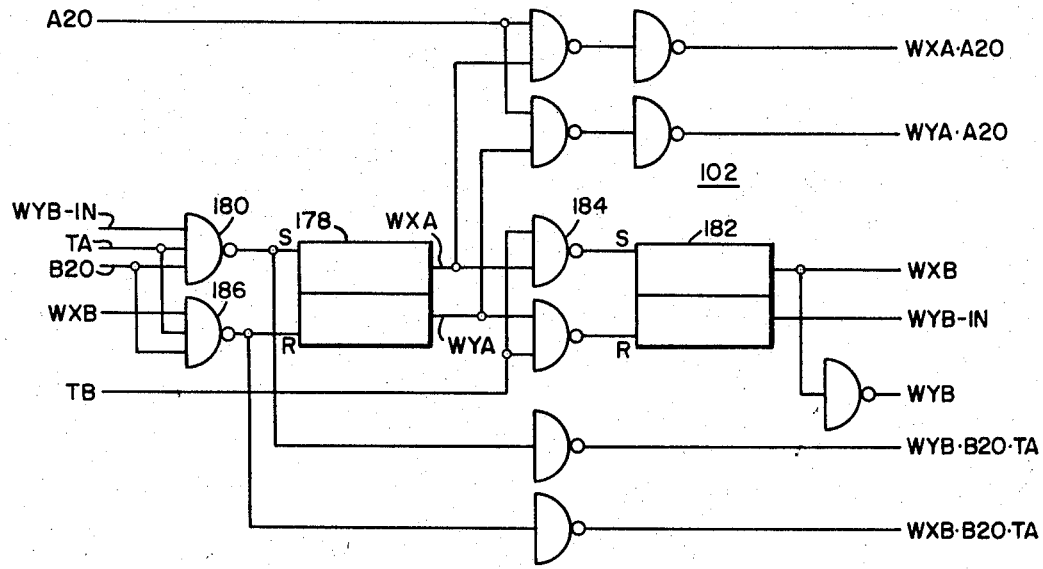
FIG. 9 shows a schematic circuit diagram of a word counter which identifies certain word times as the pulse counter cycles from count to count.

The pulse counter and decoder 100 is shown in more specific circuit detail in FIGS. 7 and 8 as a pulse counter 146 and a decoder 148. The word counter 102 is shown in more specific detail in FIG. 9. In these and subsequent more detailed circuit schematics, conventional power supply connections are omitted to provide clarity. Further, line signal symbols are generally denoted by characters respresentative of the logic information contained in the signals. Standard logic operation symbols are used where appropriate. In all logic circuit figures, logic flow is generally from left to right. In some figures such as FIG. 7, some of the far right logic signals are fed back to the far left inputs of the same figure but the connections are not shown in order to avoid confusing lengthy and crisscrossing connections. In such cases, as is true in cases where an output from one figure is fed to the input of another figure, identity of line signal designation signifies a common connection.

A. *The counting of clock pulses*

In FIG. 7, a single stage shift register binary counter 150 cooperates with a twisted ring counter 152 having five stages C1 through C5 to form the twenty state pulse counter 146. Each stage of the twisted ring counter 152 comprises a shift register formed by successive flip-flops 154 and 156, and all of the flip-flops are connected in a series loop with NAND logic circuits connected to the set and reset terminals between successive flip-flops. The loop connections are not shown but are indicated by like signal symbols such as C1B from stage C1 which is common to the input of stage C2. The ring is completed by the outputs C5B and $\overline{\text{C5B}}$ which are connected from the output of counter stage C5 to the input of counter stage C1. The phase A clock pulses TA are connected through a bus line 158 to provide set and reset scanning of the flip-flops associated with a first level of each shift register stage in the counter 146. The phase B clock pulses TB are similarly connected through a bus line 160 for the purpose of scanning the flip-flops associating with a second level of each shift register in the counter 146.

In operation of the ring counter 152, assume all flip-flops are in the reset state and C5B is a logic 0 and $\overline{C5B}$ is a logic 1. Clearance of the counter to this state at the start may be obtained by suitable means (not shown). On the next TA pulse, the output of NAND gate 162 goes to 0 and the flip-flop 154–1 is set to switch C1A output to logic 1 and $\overline{C1A}$ to 0. On the next TB pulse, the output of NAND gate 164 goes to 0 and the flip-flop 156–1 is set to switch the output C1B to 1. On the next TA pulse, the second stage first level flip-flop 154–2 is set. The process continues until the fifth subsequent TB pulse at which the flip-flop 156–5 in counter stage C5 is set to switch C5B to 1. On the next TA pulse, the first stage flip-flop 154–1 is reset, and subsequent clock pulses result in resetting all of the flip-flops. The ring counting process continues indefinitely. Each full cycle of the ring counter 152 counts ten TA pulses and ten TB pulses.

As shown in FIG. 10, the clock phase A and phase B pulses TA and TB occur alternately every microsecond in accordance with the particular embodiment of the invention under consideration. The flip-flop voltage outputs from the various indicated counting levels of the twisted ring counter 152 are also shown. Each output is a logic 1 for ten clock pulses, but the different outputs have different time spans. For example, C1A is logic value 1 from the first indicated clock pulse to the start of the eleventh clock pulse while C5B is 1 from the tenth to twentieth clock pulses. By logically combining, preferably by NAND gating, preselected pulse counter flip-flop outputs, individual bit time pulses can be produced. As previously indicated, a bit time is defined as the time period which spans the beginning of a clock pulse to the beginning of the next clock pulse of the same phase. Hence, successive time overlapping counter bit time pulses A1, B1, A2, B2, A3 . . . B20 can be made available for system use.

B. *The bit time decoding process*

As the clock pulses are counted, preselected bit times are identified by pulse outputs from the decoder 148 (FIG. 8). The following bit time pulses are generated as shown in FIG. 10 for the more significant uses indicated.

| Counter bit time: | Use |
| --- | --- |
| B1–B4 | Converter. |
| B10 | Parity detector; binary counter stage of bit counter. |
| B20 | Word counter; full adder; binary counter stage of pulse counter. |
| A1 | Error detector. |
| A20 | Word counter; half adder and subtractor. |

Other counter bit times or time spans of successive bit times (not shown) are also decoded for use in the course and medium detector 126 (FIG. 4). The decoding of any particular bit time is produced by two successive NAND circuits 170 and 172. At the first NAND stage, the complement of the output bit time can be made available for use as indicated by $\overline{B20}$, $\overline{A1}$ and $\overline{A20}$.

The particular pulse counter outputs used to generate the indicated counter bit time pulses are determined from FIG. 10. For example, CB1, CB2, and a pulse output $\overline{C6B}$ from the binary counter stage 150 are NAND gated and inverted to produce the bit time pulse B1.

The binary counter stage 150 of the pulse counter 146 counts the cycling of the twisted ring counter 152, with every two ring counter cycles resulting in a full cycle of the binary counter stage 150. To this end, bit time pulses B10 and B20 are respectively NAND gated with TA clock pulses to set and reset flip-flop 174 and to produce signals C6A and $\overline{C6A}$. The signals C6A and $\overline{C6A}$ in turn are respectively NAND gated with TB clock pulses to set and reset another flip-flop 176 and produce the signals C6B and $\overline{C6B}$.

C. *Counting words*

Figure 11:
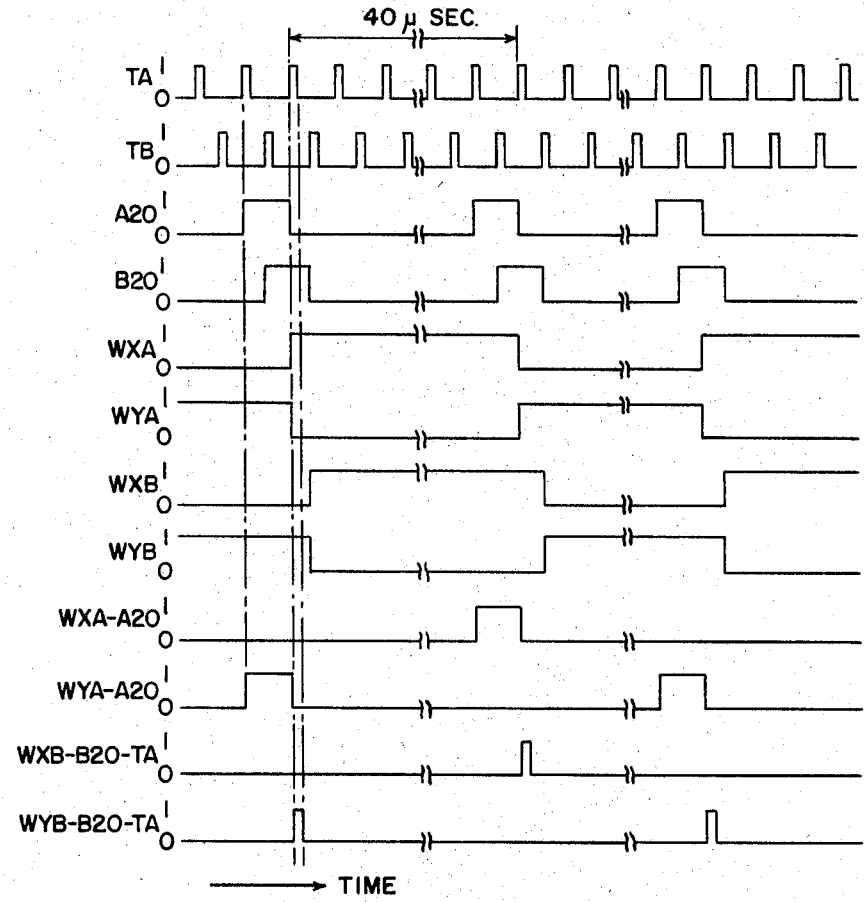
FIG. 11 shows certain outputs from the multiphase clock and the word counter.

The word counter 102 (FIG. 9) is a single stage binary counter which counts successive twenty state counts of the pulse counter 146 to identify word X and word Y time for logic control of the processing of X and Y axis position information at various points in the control system 42. The word counter 102 cycles once for each two cycles of the pulse counter 146. The time forms of the word counter output pulses are shown in FIG. 11.

At the start of word counting, assume flip-flop 178 is reset, and when phase A clock pulse TA occurs during the next bit time B20, the flip-flop 178 is set through a NAND gate 180 and word X phase A time WXA then begins. At the next phase B clock pulse TB, a flip-flop 182 is set through another NAND gate 184 to mark the beginning of word X and phase B time WXB. The successive beginnings of WXB times are in this embodiment defined as the start of successive clock system iterations.

When bit time B20 and clock pulse TA again occur, the flip-flop 178 is reset through NAND gate 186 to mark the end of WXA time and the beginning of word Y phase A time WYA. The next clock pulse TB resets the flip-flop 182 to mark the end of WXB time and the beginning of WYB time. Logic signals $WXA \cdot A20$ and $WYA \cdot A20$ are generated for gating use at various system points by NAND gating A20 respectively with WXA and WYA and inverting. An end of iteration signal $WYB \cdot B20 \cdot TA$ and an end of word X time signal $WXB \cdot B20 \cdot TA$ are obtained by inverting the outputs of the NAND gates 180 and 186.

D. *The preference for solid state devices, molecular logic circuits and NAND logic*

Generally, solid state devices are preferred for use wherever advantages from use offset disadvantages from nonuse. In this case, the dividing line is largely made between low power and high power circuitry. Accordingly, solid state devices are preferably used in the input data processing system 44, the clock system 52 and the storage system 45, and part of the auxiliary function logic. Logic components such as relays are preferably used at the higher power levels in the auxiliary function logic output and the machine drive logic output.

Low power logic circuits are preferably formed with solid state molecular or integrated component or monolithic logic blocks to improve system reliability by reduced numbers of components and connections, to reduce the system logic, to provide manufacturing and operating economy particularly through elimination of need for external cooling, to provide increased data processing speed, and to provide greater logic capacity in a given logic package volume. Most of the molecular logic blocks are preferably diode transistor or DTL NAND blocks since such blocks characteristically have a fast switching time (about 20 nanoseconds), have relatively high production yield, and have at this date the best proven reliability history of any commercially available molecular logic block type.

Where two signals are expected to occur at nearly the same time and are to be logically combined, it is normally necessary to perform the logic with two successive logic stages which are operated by successive clock pulses since slight differences in switching time and other circuit variables can otherwise cause a timing failure, commonly called a "racing" failure. The multiphase clock makes the use of successive DTL NAND blocks or other negative logic feasible and convenient since separate time successive clock pulses are provided for respectively triggering successive NAND logic stages.

With a single phase clock system, the use of NAND blocks is problematical since NAND units normally operate an the leading edge of a trigger pulse and timing or racing problems thus would occur in the sense that a second stage NAND must be held for switching by a single phase clock pulse until the first stage NAND is switched by the same single phase clock pulse. In the single phase clock system, such racing problems can ordinarily be resolved by controlling successive logic stages controlled with successive single phase clock pulses, but, for logic controls similar to the present one, the solution normally requires the use of additional interstage circuitry which can increase the product cost and decrease circuit reliability.

To minimize the problem of random error switching, the logic blocks in the logic package are preferably physically shielded in the overall control package so as to isolate the logic from external noise. Connections to the logic package can be through buffer relays to reduce the noise problem further.

Figure 24:
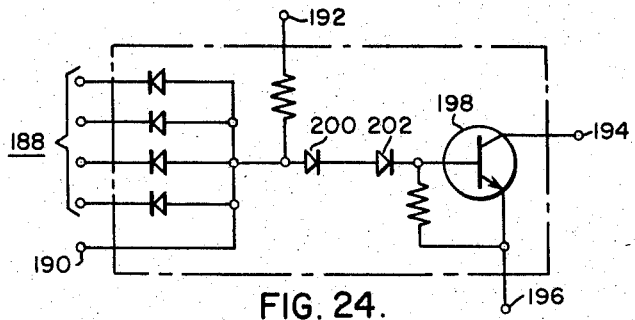
FIG. 24 shows a schematic equivalent circuit for a NAND molecular logic block.

In FIGURE 24, there is shown an equivalent NAND circuit for a single gate molecular DTL NAND logic block. Generally, such blocks are formed from silicon or other semiconductor base material, and various P and N regions and PN junctions are produced by doping processes to form the required diodes, resistors and transistors in a predetermined solid geometry. The NAND circuit block in this example includes four input terminals 188, a node terminal 190 and power supply, output and ground terminals 192, 194 and 196 respectively. The NAND circuit includes a transistor 198 with a collector output connected to the output terminal 194 and an emitter output connected to the ground terminal 196. If all of the inputs are at a high voltage level, base drive current is fed to the transistor 198 through directing diodes 200 and 202 and the transistor conducts to place the output at ground potential or in a logic 0 state. If any input goes to zero, power supply current is directed through that input and transistor drive current is removed so that the output terminal 194 goes to a logic 1 state.

Figure 25:
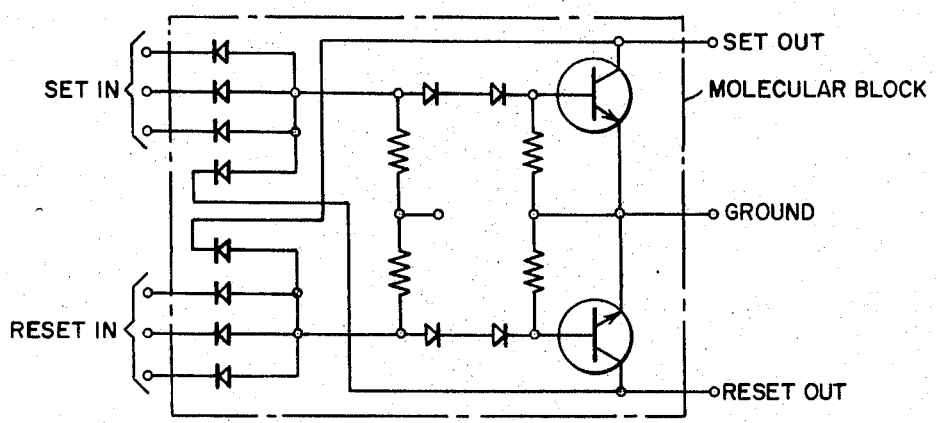
FIG. 25 shows a schematic equivalent circuit for a NAND flip-flop molecular logic block.

The preferred R-S flip-flop is also a NAND logic block, and it is formed by two cross-connected NANDS 204 and 206 as shown in FIG. 25. Three set inputs and three reset inputs are provided as well as a set output terminal 208 and a reset output terminal 210. The set output is logic 1 when any set input is logic 0 and it remains at logic 1 until an input reset 0 occurs when the set input is logic 1. The reset output is similarly operated.

Other NAND logic block forms can be used in the preferred system logic package. For example, multiple NAND circuits can be commonly provided in a single block with electrically separate inputs and outputs.

E. *The read in cycle in more detail*

The previous description of the read in cycle will now be amplified by consideration of the more detailed schematics of the preferred circuit forms of the tape reader control 112, the tape reader synchronizer 116 and the read in counter 118. The read in role of the preferred circuit forms of the sign and word storage unit 72, the shift register 110, the full adder 108 and the command and position storage unit 104 will also be considered. To facilitate an understanding of the processing of input data, there is shown in FIG. 4A a schematic diagram of the manner in which data flows through the various functional units of the control system 42 during the read in cycle.

The tape reader drive 114 (FIG. 13) includes an oscillator 212 which becomes operative when a master clear signal $SZ \cdot MR$ is generated to drive the oscillator input to logic 0, for example at the start of a machining operation. The oscillator 212 has an output TR GATE (FIGS. 13 and 13A) which in this case comprises a 27 millisecond pulse once each 45 milliseconds. TR GATE is amplified and inverted by an amplifier 214 to produce the complement $\overline{TR\ GATE}$ for use as a gating signal in the tape reader control 112. The oscillator 212 also directly produces the complement $\overline{TR\ GATE}$ which is amplified and inverted by an amplifier 216 to produce the signal TR GATE at the input of an AND circuit 218 which in turn controls a tape advance relay or other suitable switching device 220. The tape drive cycle is started when an ADTR signal is received at the input of the AND gate 218 from the tape reader control 112. The ADTR signal also serves to gate the synchronizing signal output of the tape reader synchronizer 116.

Figure 12:
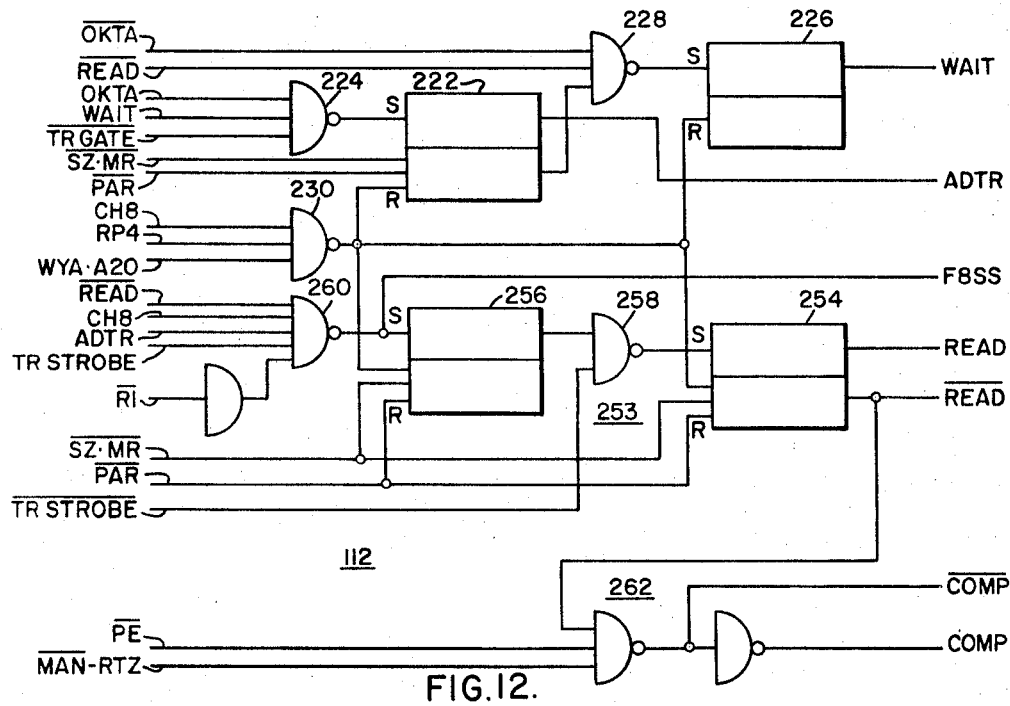
FIG. 12 shows a schematic diagram of a preferred circuit for a tape reader control employed in the control system.

In the tape reader control 112 (FIG. 12), the gating signal ADTR for the tape reader drive 114 and the tape reader synchronizer 116 is generated by a tape advance memory flip-flop 222 which is set when NAND gate 224 is gated by signals $\overline{TR\ GATE}$, OKTA and WAIT. With the generation of $\overline{TR\ GATE}$ gating is initiated when the signal OKTA is generated by a suitable start switch (not shown) and the signal WAIT is generated by a wait flip-flop 226. A NAND gate 228 is operated by $\overline{OKTA}$ from the starting switch and $\overline{READ}$ from an output of the tape reader control 112 in controlling the flip-flop 226. The reset output from the tape advance flip-flop is also NAND gated as a condition precedent for the wait flip-flop 226 to be set.

Once the tape reader 54 is started, it runs until it reads CH8 or encounters a parity error. Normally OKTA is present longer than the block read time, and the wait flip-flop 226 thus prevents multiple block read cycles. $\overline{READ}$ gates the NAND gate 228 to prevent double block read cycling if OKTA is removed and reapplied during one block read cycle.

The tape advance flip-flop 222 is reset by a master clear signal $\overline{SZ \cdot MR}$ or by a parity error signal $\overline{PAR}$ from the parity detector 120. Both flip-flops 222 and 226 are reset by an output from an end of block indicator NAND gate 230, i.e. when a CH8 signal occurs at RP4 time of the read in counter 118 and $WYA \cdot A20$ time of the word counter 102. Once the tape reader control 112 is started, the tape advance flip-flop 222 is set to generate ADTR until it is reset, for example at the end of the first read in cycle as indicated by an end of block signal.

Figure 13A:
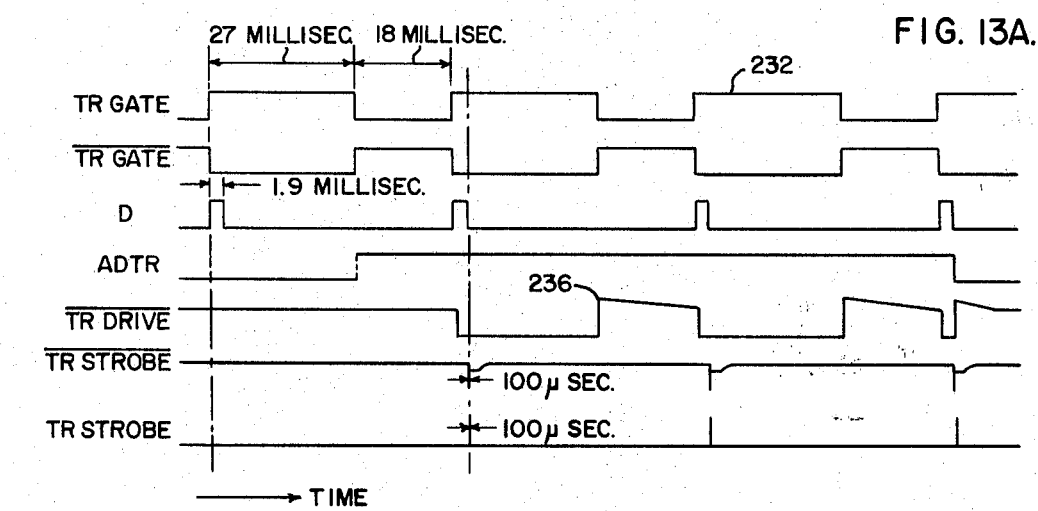
FIG. 13A shows certain pulse trains associated with the tape reader control and the tape reader synchronizer and driver.
Figure 13:
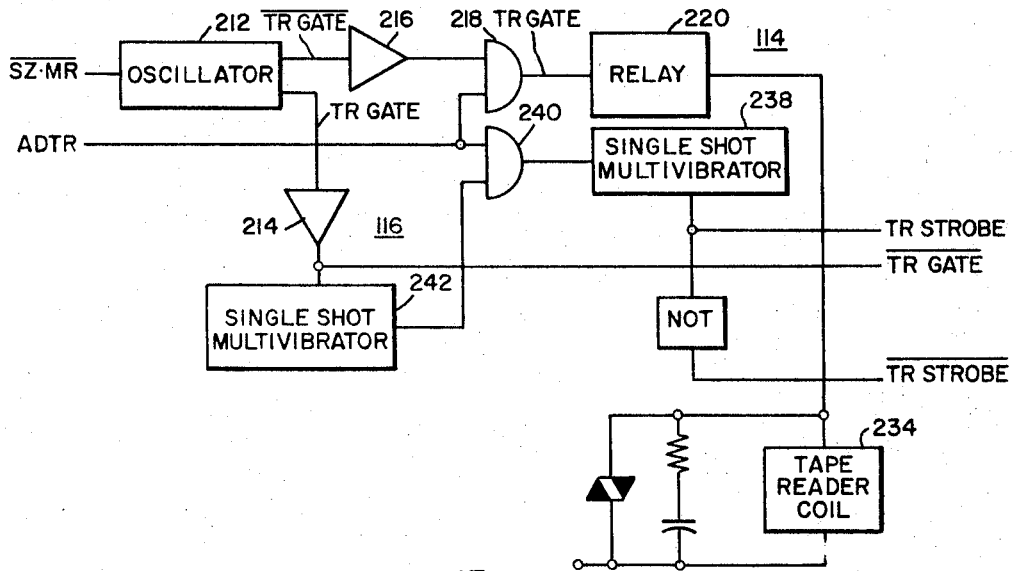
FIG. 13 shows a schematic diagram of a preferred circuit for a tape reader synchronizer and driver employed in the control system.

When the first oscillator pulse is generated after the tape reader control 112 is started as indicated by the reference character 232 in FIG. 13A, the ADTR signal and the oscillator pulse TR GATE operate the tape drive AND circuit 218 to switch the tape drive relay 220. The relay output $\overline{TR\ DRIVE}$ is normally at logic 1 value (at a voltage of 24 volts for example) and it is switched to 0 value. Voltage thus appears across a stepping switch type tape reader drive coil 234 until the $\overline{TR\ DRIVE}$ signal returns to 1 value as indicated by the reference character 236 at the end of the oscillator pulse 232. The tape reader 54 accordingly is advanced one line by the coil 234. Successive TR GATE oscillator pulses during the continuance of the ADTR signal from the tape reader control 112 repeatedly result in energization and deenergization of the drive coil 234 to produce tape advance at the exemplary rate of twenty to sixty or more lines per minute. Higher tape advance rates can be employed if desired.

The previously noted synchronizing signal generated by the tape reader synchronizer 116 is produced by a single shot multivibrator 238 shortly after the TR GATE signal is generated so as to provide for initiating operation of the read in counter 118 which controls the read in cycle and synchronizes the processing of input data with the tape reader cycle. Thus, as shown in FIG. 13A, a TR STROBE pulse is generated periodically during the continuance of the ADTR signal and after the start of each oscillator TR GATE pulse.

The single shot multivibrator 238 is operated by periodic pulses from an AND gate 240 which has the ADTR signal at one input and an output from another single shot multivibrator 242 at its other input. Each time $\overline{TR\ GATE}$ goes to 0, the multivibrator 242 generates a 1.9 millisecond delay pulse D which, when AND gated with the ADTR signal, produces a similar and nearly simultaneous pulse output from the AND gate 240. When the pulse from the AND gate 240 goes to logic 1, the single shot multivibrator 238 is operated to produce a TR STROBE pulse. The delay in generation of pulses in the synchronizing signal TR STROBE after the start of the oscillator TR GATE pulses is made in order to assure that the channel lines have reached their proper levels and are ready for interrogation.

Figure 14:
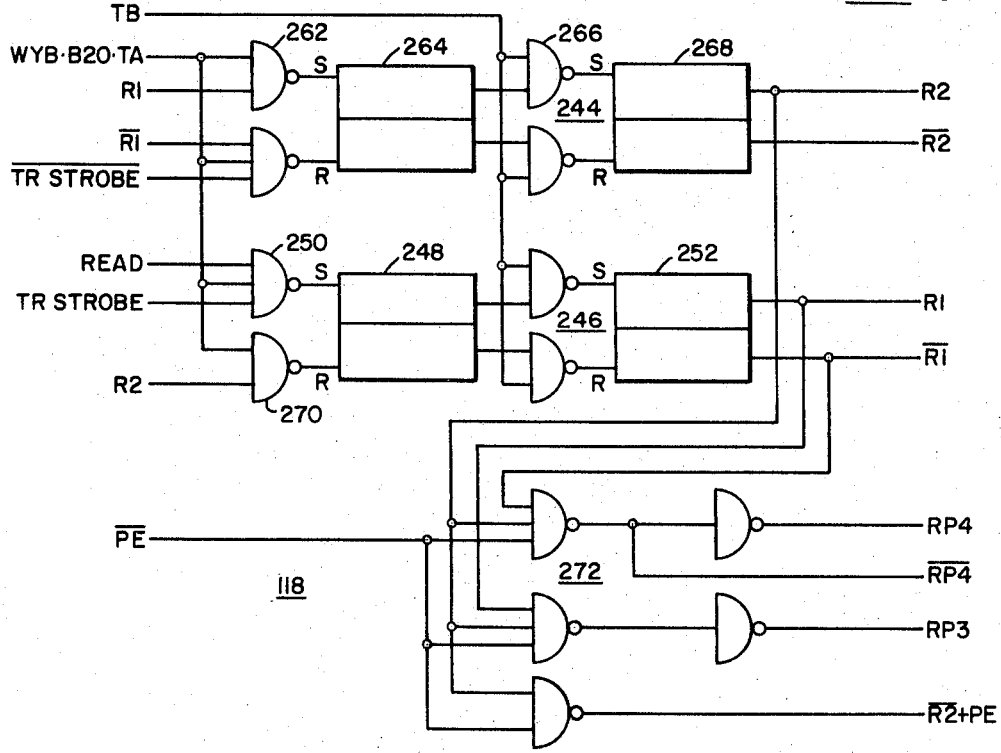
FIG. 14 shows a schematic diagram of a preferred circuit for a read in counter employed in the control system.

The read in counter 118 (FIG. 14) comprises two counter stages 244 and 246. Before it is started, it is in a rest state when all flip-flops are in the reset state. The read in counter 118 is started when a READ signal is received from the tape reader control 112 simultaneously with a TR STROBE pulse and the recurring end of iteration signal $WYB \cdot B20 \cdot TA$ from the word counter 102. The TR STROBE pulse is in this case 100 microseconds long to assure its coincidence with the end of iteration signal $WYB \cdot B20 \cdot TA$ which occurs once every 80 microseconds. A synchronizing flip-flop 248 is set by the operation of NAND gate 250 during the coincidence of the tape reader start signal READ, a synchronizing TR STROBE pulse and the word counter iteration start signal $WYB \cdot B20 \cdot TA$. On the next phase B clock pulse TB and at the start of the next iteration, flip-flop 252 is set to produce R1 at logic value 1 and thereby start a first read in time period.

The READ signal, which enables the read in counter 118 to be started, is generated by a read memory flip-flop 254 in the tape reader control 112. The READ signal defines the total read in time for any one tape data block, and comparison time is defined by a COMP signal from a comparison detector 262 when the READ signal coexists with a no parity error signal PE and a suitably generated no manual and return to zero signal $MAN \cdot RTZ$. The read memory flip-flop 254 forms the output of a read detector 253 and additionally generates the signal $\overline{READ}$ when in its reset state to establish the previously described condition precedent for the generation of the ADTR signal. The read memmory flip-flop 254 is set when flip-flop 256 is set and when $\overline{TR\ STROBE}$ appears at the input of NAND gate 258. In turn, the flip-flop 256 is set when the inputs $\overline{READ}$, detector CH8 (indicating start of tape data block), ADTR, $\overline{R1}$ and TR STROBE coincide at the input of a start of block detector NAND gate 260. The flip-flops 254 and 256 are both reset by clear and parity error signals $\overline{SZ \cdot MR}$ and $\overline{PAR}$ and by the end of block signal NAND gate 230. The signals F8SS taken directly from the NAND gate 260 is suitably used to clear the parity detector 120 at the start of reading each tape data row.

The first start of block CH8 pulse read by the tape detector 60 results in setting the flip-flop 256 when a TR STROBE pulse appears after the first oscillator pulse 232 during the generation of the signal ADTR. A $\overline{TR\ STROBE}$ pulse occurs after the first TR STROBE pulse and the read memory flip-flop 254 is set to produce the READ signal, but the read in counter is not started since the TR STROBE signal is then at 0. When the tape reader is advanced to the data now following the start of block character, a new TR STROBE pulse is generated to start the read in counter 118 since the READ signal is then at the input of the read in counter NAND gate 250. This allows reading a blank or garbled tape leader when the tape is first put on, and when there is a parity error the tape can be started anywhere in the preceding block.

Once started, the read in counter 118 counts successive iteration time periods during which particular input logic processes are completed. Thus, after the flip-flop 252 has ben set to generate R1, the next end of iteration pulse $WYB \cdot B20 \cdot TA$ operates through NAND gate 262 to set flip-flop 264. On the next phase B clock pulse TB, the first iteration time period is ended, and NAND circuit 266 is operated to set flip-flop 268 and generate R2 at logic value 1 to begin a second iteration time period. When the next iteration end pulse is generated, NAND gate 270 is operated to reset the flip-flops 248 and 252. A third iteration time period is then begun. Finally, on the next iteration end pulse, the flip-flops 264 and 268 are reset to end the read in count and the read in counter 118 is again in a rest state until the next TR STROBE pulse, i.e. after the tape reader 54 is advanced to a new tape data row.

The counter outputs R1 and R2 are fed to a register control 272 which includes NAND gates as indicated to decode the signals R1 and R2, when there is no parity error, and produce outputs RP4, $\overline{RP4}$, RP3, and $\overline{R2}+PE$. The following logic table describes the logic operation of the register control 272.

|      | R2 | R1 |
|------|----|----|
| RP1  | 0  | 0  |
| RP2  | 0  | 1  |
| RP3  | 1  | 1  |
| RP4  | 1  | 0  |

Figure 15:
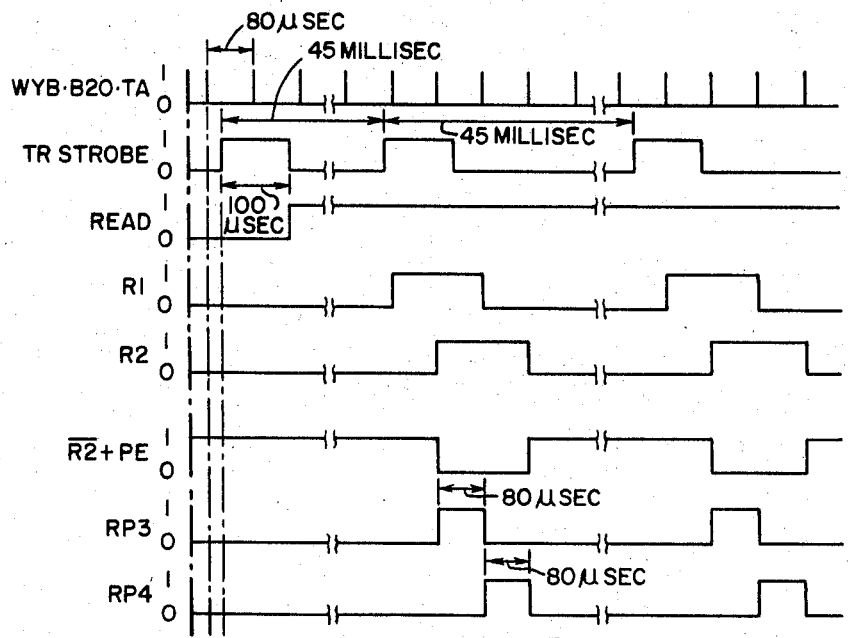
FIG. 15 shows certain outputs from the multiphase clock and the tape reader synchronizer and the read in counter.

The time waveforms for the register control pulse outputs are shown in FIG. 15. The register control output $\overline{R2}+PE$ stops the alpha and numeric detectors 70 and 68 when there is a parity error, and the outputs RP3 and RP4 go to the full adder 108 to control the registration of numeric command information on the delay line 103. The output RP4 also goes to the tape reader control 112 as previously described and to the sign and word storage unit 72 for the purpose of gating a delay line clear signal as subsequently described. As indicated in the general diagram of FIG. 4, the read in counter 118 also provides certain controls in the auxiliary machine control detector 64 after position data is registered and auxiliary function instructions are being read from the same tape data block.

During RP1 time, the read in counter 118 is in the rest state. During RP2 iteration time, a parity count is made of any numeric or alpha or other character then being read by the tape reader 54. The read in counter 118 continues only if parity is detected.

In RP3 and RP4 iteration times of successive read in counts, numeric X and Y binary coded digits are converted to respective binary number signals on the delay line 103. The conversion from binary coded digits to binary numbers is more generally described in a copending application Serial No. 493,821, entitled Circuit for Converting Binary Coded Decimal Digits to a Binary Number, filed by R. Sharland and the present inventor on Oct. 7, 1965, and assigned to the present assignee.

In brief summary of the read in operation so far described, the tape reader oscillator 212 is started to generate a TR GATE signal, and the tape reader control 112 is then started to generate the advance tape signal ADTR after the OKTA signal is applied. The tape reader 54 advances one row after each TR GATE pulse. Before each tape reader advance, a TR STROBE signal is generated by the synchronizer 116. With the generation of ADTR and TR STROBE, the tape reader control 112 generates the signal READ to start the read in counter 118 after the first CH8 is detected in a block of tape data. The read in counter 118 goes through one count cycle for each subsequent tape row advance, and the start of successive read in counts is synchronized with successive TR STROBE pulses at iteration starting times. When the tape data block is read in, the tape reader control 112 is stopped by a CH8 signal and the comparison cycle is started. The same CH8 character is subsequently read to restart the read in process for the next tape data block. Read in and comparison cycling continues until the tape program is completed.

After the read in counter 118 has been started and after an X or Y or sign character has been read from the tape, the word and sign storage unit 72 produces address signals which provide for registering X numeric and sign data in X word time and Y numeric and sign data in Y word time. To achieve the required addressing functions, the sign and word storage unit 72 comprises an X word memory flip-flop 274 and a Y word memory flip-flop 276.

The X memory flip-flop 274 is set by an X detector NAND gate 278 during the reading of an X character on the tape, that is when an alpha signal and CH3 signals are received respectively from the alpha detector 70 and the input detector 60. Similarly, the Y memory flip-flop 276 is set by a Y detector NAND gate 280 during the reading of a tape character Y when appropriately addressed signals from the tape and alpha detectors 60 and 70 are received. NAND command data clear gates 282 and 284 provide an output $\overline{X\alpha} + \overline{Y\alpha}$ during the read in counter RP4 time (i.e. after parity check) and during WXB or WYB word time for clearance of previous X or Y command data from the delay line 103 when a new X or Y character is in the tape read position to set the X or Y memory 274 or 276. The master clear signal $\overline{SZ} \cdot \overline{MR}$ or the reading of a new alpha character provides word memory reset.

A NAND command register network 286 provides a 40 microsecond word gating signal REG when addressed by numeral detector output NUM and during WXA word time if the X memory 274 is set or during WYA word time if the Y memory 276 is set. The complement $\overline{REG}$ is also made available.

A minus memory flip-flop 288 is set to produce a minus signal during the read in counter RP4 time with appropriate tape detector channel information. If the signal flip-flop 288 is not set during the reading of X or Y position data it remains reset and produces a PLUS signal. If it is set, it is reset after X or Y data is read and a new ALPHA character is detected on the tape. Phase B clock pulses TB are used for NAND gating in the X, Y and sign memories 274, 276 logic circuits primarily to improve input signal to noise ratio.

In summary of the word and sign store logic, the following formulas apply (neglecting TB):

$XM = CH3 \cdot \overline{CH7} \cdot ALPHA$
$YM = CH4 \cdot ALPHA$
$MINUS = \overline{CH6} \cdot CH7 \cdot \overline{CH1} \cdot \overline{CH5} \cdot RP4$
$PLUS = \overline{MINUS}$
$REG = (XM \cdot WXB \cdot NUM) + (NUM \cdot YM \cdot WYB)$
$\overline{X\alpha} + \overline{Y\alpha} = (\overline{WXE \cdot RP4 \cdot XM \cdot ALPHA})$
$+ (\overline{WYB \cdot RP4 \cdot YM \cdot ALPHA})$ To achieve data conversion from time series X or Y binary coded decimal numbers to a pure time series binary number, the full adder 108 is employed during the read in cycle in conjunction with the shift register 110 and the command and position storage unit 104 to produce the necessary multiplication and additions required for the process. The process of coversion is based on the principle that any decimal number, for example a five digit number having digits A, B, C, D, and E can be written in the following form:

$\{[(A \times 10 + B) 10 \times C] 10 + D\} 10 + E = A, B, C, D, E$

Therefore, when successive decimal digits of a number are read most significant digit first, the number can be written by multiplying the first digit A by 10 and adding the result to the second digit B, multiplying the new figure by ten and adding the result to C, etc.

In this case, the most significant decimal digit is the first binary coded digit read and it is multiplied by ten by shifting the binary coded digit by two binary places to produce four times the original binary coded digit, adding the product to the original binary coded digit to obtain a first result equal to five times the original binary coded digit, and shifting the first result by one binary place to produce a second result equal to a decimal number ten times the decimal number which corresponds to the original binary coded digit. The next binary coded digit is added to the second result and the multiplication process is repeated. After the arithmetic operations have been completed for all of the binary coded digits, the resulting time series binary number corresponds to the original decimal number.

Figure 21:
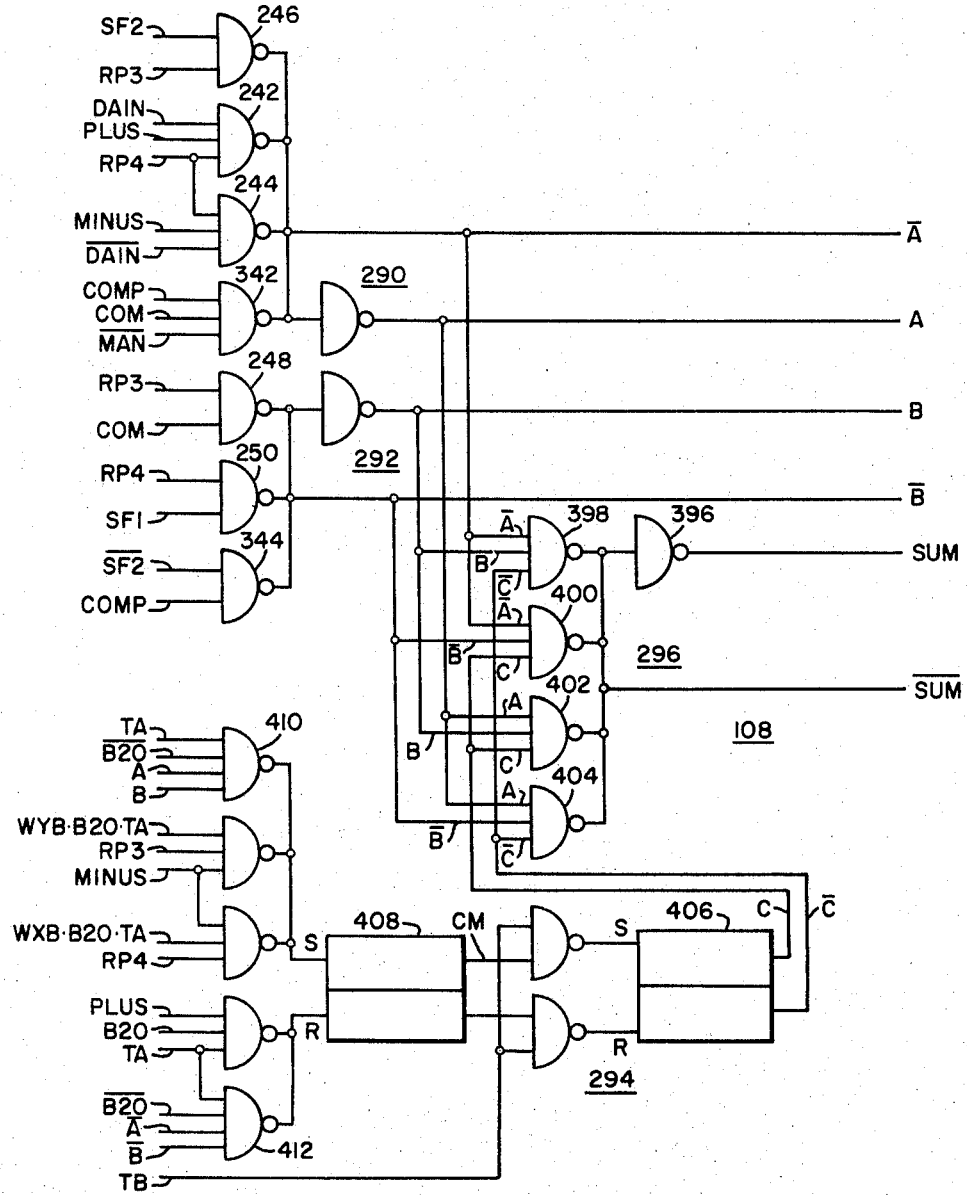
FIG. 21 shows a schematic diagram of a preferred circuit for a full adder employed in the control system.
Figure 22:
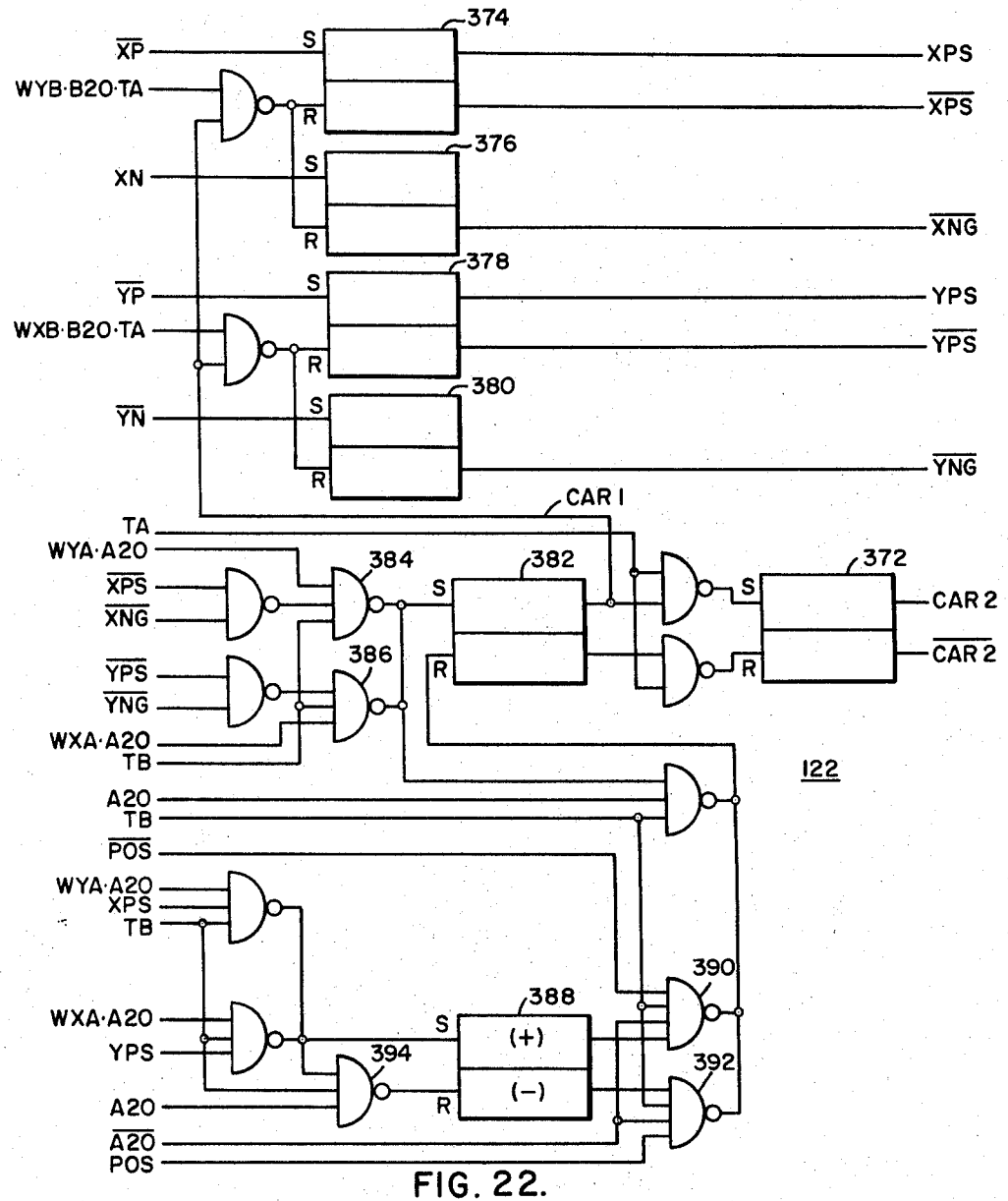
FIG. 22 shows a schematic diagram of a preferred circuit for a half adder and subtractor employed in the control system.

In the full adder 108 (FIG. 21), an addend processer 290, an augend processer 292 and a carry register 294 are cooperatively combined with a sum processer 296 to produce a SUM or $\overline{SUM}$ signal. Appropriate gating is provided to admit the proper addends or augends from the shift register 110 or the command and position storage unit 104 or the converter 106 at the proper times. During the read in cycle, the adder output SUM is admitted to the storage unit 104 through a read in command NAND gate 298 during the intervals of the address gating signal REG in the read in cycle. Hence, no non-numeric data is admitted to the delay line 103 since the REG signal requires the NUM address signal. After the read in cycle and during the comparison cycle, the adder output SUM is transmitted to the error detector 124.

All of the addend and augend input time series signals are of the non-return-to-zero type and are set or reset during the TB clock pulse times. The SF2 signal during RP3 time, the SF1 signal, and the COM signal are, as subsequently considered, input data command signals at various stages of logic processing. DAIN and $\overline{DAIN}$ from the converter 106 includes bits recorded during the time span of B bit time pulses. $\overline{SF2}$ is a phase delayed position data signal used for data comparison purposes during the comparison cycle as subsequently described. Thus, the sum processor 296 likewise produces the SUM signal as a non-return-to-zero type signal with set and reset on TB clock pulses and bits recorded in the SUM signal can thus be readily processed by scanning the SUM signal with TA clock pulses as considered in connection with the command and position storage unit 104.

In performing the addition operation, a SUM output NAND gate 296 produces a 1 bit if an output 0 value is produced during any TB clock pulse by an augend only output NAND gate 398, a carry only output NAND gate 400, an augend-addend-carry output NAND gate 402, or an addend only NAND gate 404. This corresponds to the arithmatic process of binary addition as represented by the following logic table during a given TB clock pulse time:

| A | B | C | SUM |
|---|---|---|-----|
| 0 | 0 | 0 | 0 |
| 1 | 0 | 0 | 1 |
| 0 | 1 | 0 | 1 |
| 0 | 0 | 1 | 1 |
| 1 | 1 | 1 | 1 |

The other logically possible combinations result in a carry digit placed in memory in the carry register 294 for processing in the sum processor 296 during the next TB clock pulse. The following logic table applies for carry memory set:

| A | B | C | CM |
|---|---|---|----|
| 1 | 1 | 0 | 1 |
| 1 | 0 | 1 | 1 |
| 0 | 1 | 1 | 1 |

The carry memory remains set for successive pulses in which any two or three of the variables A, B and C are at 1 value. The carry memory is reset on the first TB clock pulse after set when no A and no B signal appear.

To produce the carry signal C, the carry register 294 includes a carry memory flip-flop 406 which is set and reset on TB clock pulses following set or reset of another carry memory flip-flop 408 on TA clock pulses. The carry memory flip-flop 408 is set by addend and augend NAND gate 410 during $\overline{B20}$ time, i.e. any time except that reserved for the sign bit. The flip-flop 408 is reset by NAND gate 412 when $\overline{A} \cdot \overline{B}$ occur during $\overline{B20}$ time. It is also reset when the PLUS address signal occurs during $B20 \cdot TA$ time to prevent carry propagation into the next word when the number being read from the tape is positive. The gate 412 allows the carry memory flip-flop 408 to be set in B20 time when the tape number is negative. Thus, the carry memory flip-flop 408 is set at the end of word time WYB during RP3 and at the end of word time WXB during RP4 when the MINUS address signal is present so as to provide for registration of negative tape numbers in two complement form.

In the registration of negative tape numbers, the ones complement signal $\overline{DAIN}$ from the converter 106 is admitted to the full adder 108 through the gate 244. The carry memory flip-flop 408 is preset during B20 time to add a 1 bit to $\overline{DAIN}$ at iteration start time. As a result, the converter or tape binary number is changed from ones complement form to twos complement form and the result is equal to $2^{19}$ minus the tape number. Negative numbers are thus conveniently registered without the use of a full subtractor. Further, with twos complement registration, a carry is propagated into the B20 bit time so as to generate a 1 bit in that time period of the SUM signal. A sign bit is thus effectively incorporated in B20 time of the SUM signal to identify the sum number as being a binary number in twos complement form rather than a positive binary number.

In the command and position storage unit 104, command and position data is multiplexed onto the sonic delay line 103 as a return-to-zero time series signal by clock control during the read in and the compare cycles. Command data is entered through the time shared write amplifier 306 during clock pulse TAS times and position data is entered during clock pulse TBS times.

A dynamic binary serial storage register is a comparatively economic means for storing data in machine tool applications. It is characterized with a requirement that stored data be circulated, or else it is lost. The preferred form of the register is a sonic delay line as shown schematically in FIG. 26. The delay line 103 can comprise a straight rod 300, or a coiled rod (not shown), which is formed from Nichrome or other suitable material. Generally, the rod 300 is end supported in its package by absorptive material 305 substantially to prevent acoustic end reflections. A write coil 302 and a read coil 304 are associated with respective magnets 301 at opposite ends of the rod 300. A write amplifier 306 of suitable design is connected to the write coil 302 which produces a magnetic field change and a magnetostrictive force change on the rod 300 each time the output from the write amplifier 306 changes. A sonic vibration results from each magnetostrictive force change and travels down the rod 300 to the read coil 304 where the acoustic energy is transformed to electric energy for read amplification because the reluctance of the permanent magnet flux path is varied by the sonic vibration. The register can also be provided in the form of a glass delay line. In that case, piezoelectric action forms the basis of electro-acoustic energy conversions at the write and read ends of the glass line.

In this instance, total registration time length is 80 microseconds, and about 78.5 microseconds of the total is provided by the delay line length. The balance is provided by a resynchronizing and storage circuit 310 which is coupled to the output of the read amplifier 308, preferably through a second stage read amplifier 312 which is connected to the read amplifier 308 through terminal 313. The principal purpose of the circuit 310 is to store the time series delay line output bits for about 1.5 microseconds for synchronous recirculation or other use exactly one iteration time period after entry on the delay line 103, i.e. 80 microseconds after delay line entry. The propagation time of the delay line 103 can vary with temperature and other ambient conditions and the clock bit generation rate can also vary, but normal propagation time and clock frequency variations have no effect on the system performance.

Each position data bit is read from the delay line 103 to set a position bit memory flip-flop 314 in the nineteenth B bit time after its delay line entry bit time and after the TBS clock pulse in the read bit time. It is noted that a 1 bit on the delay line 103 is negated by the amplifier combination 308 and 312 to set the flip-flop 314. When the TAS clock pulse occurs in the read bit time, a position synchronizer memory flip-flop 316 is set to produce non-return-to-zero output POS during the succeeding A bit time. The flip-flops 314 and 316 are reset respectively during TBS and TAS in the B bit time after the read B bit time.

For example, if a positon bit is entered on the delay line during the TBS clock pulse in B1 of WXB time, it is read after the TBS clock pulse B20 of WYB time to set the flip-flop 316 on the TA clock pulse in B20. It is then available in A1 bit time for delay line reentry on the next TBS pulse at the start of the new $B1 \cdot WXB$ time.

Similarly, each command data bit sets a command pulse memory flip-flop 318 after the TAS clock pulse in the nineteenth A bit time after delay line entry. A command synchronizer memory flip-flop 320 is then set to provide a non-return-to-zero output COM during the succeeding B bit time for delay line reentry on the next TAS clock pulse.

In addition to the read in command gate 298, the command and position storage unit 104 is provided with a recirculation command NAND gate 322 which admits command data during the comparison cycle. An update position NAND gate 324 and a recirculation position NAND gate 326 provides for delay line entry of position bits. During any one iteration, only one of the position gates 324 or 326 and one of the command gates 322 or 298 may be opened. The position gates 324 and 326 are strobed by TBS clock pulses so as to be gateable only in phase B time while the command gates 322 and 298 are strobed by TAS clock pulses so as to be gateable only in phase A time. The write amplifier 306 records a bit on the delay line 103 when its input terminal 307 goes to logic 0.

A more general disclosure of the electronic multiplexing of data into a dynamic binary serial storage register or a sonic delay line is presented in another copending application Ser. No. 485,293, entitled Electronically Multiplexed Dynamic Serial Storage Register, filed by E. R. Higgins and the present inventor on Sept. 7, 1965, and assigned to the present assignee.

The shift register 110 (FIG. 19) comprises a first stage having an output single shift flip-flop 328 and a second stage having an output double shift flip-flop 330. The flip-flop 328 is set or reset on successive TB pulses by flip-flop 332 which in turn is set or reset on TA pulses in accordance with the time series binary signal COM from the command and position storage unit 104 when address gating signal REG exists during the read in cycle. Thus, shift register time series output SF1 is equal to time series signal COM delay shifted by one binary place.

Similarly, any SF1 bit or its complement bit is used through NAND gates 334 to set or reset a flip-flop 336 on TA pulses and the double shift flip-flop 330 on succeeding TB pulses. The time series SF2 signal is thus delay shifted by two binary places from the COM signal.

To economize in the use of circuit components, the double shift flip-flop 330 is time shared for use in the comparison cycle when it is set and reset by NAND gates 332 and 334 on TB pulses to delay shift the POS signal by one clock bit for reasons subsequently to be considered. NAND gates 338 and 340 are also employed in conjunction with the flip-flops 328 and 336 during the comparison cycle to produce a signal SF2A which then has no effect on the flip-flop 330 and goes to the drive logic 128 for the purpose of controlling the drive direction until the first full Y or X error word occurs at the start of the comparison cycle.

Figure 20:
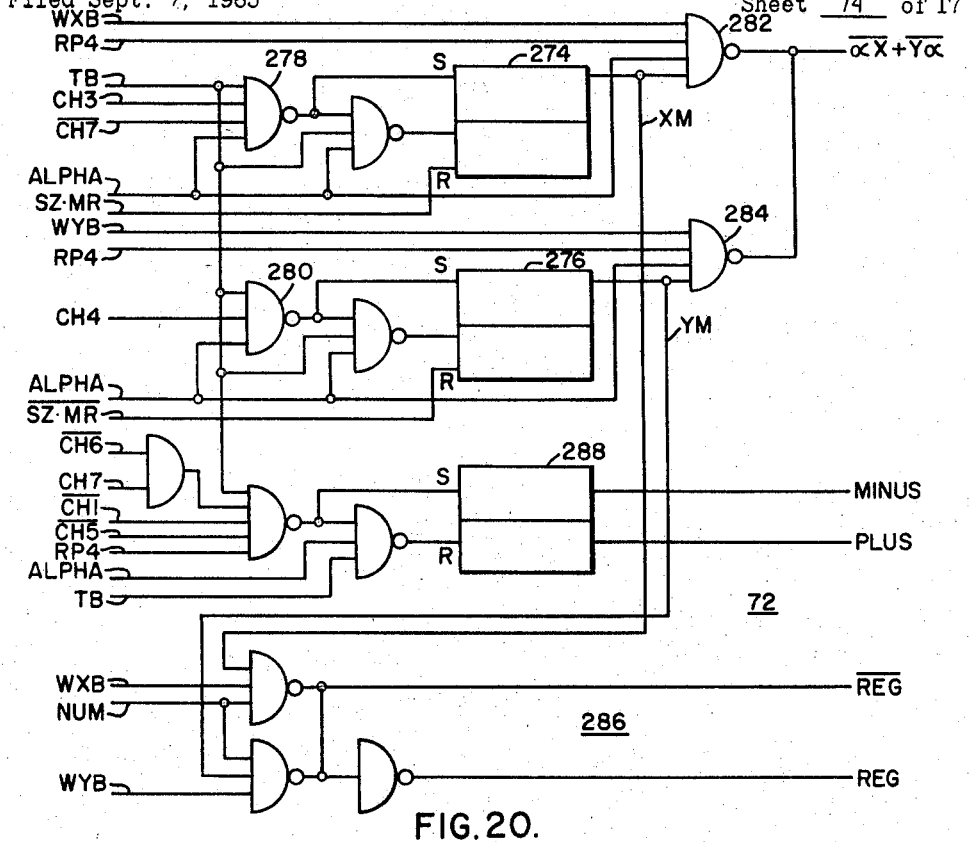
FIG. 20 shows a schematic diagram of a preferred circuit for a word and sign storage unit employed in the control system.

To illustrate the operation of the shift register 110 and the full adder 108 during the read in cycle, the registration of an arbitrary X number plus 10824 will be considered. Assume that the delay line 103 has been cleared of the data by the signal $\overline{X\alpha+Y\alpha}$ after the X character has been read to set the X memory 274 (FIG. 20) and generate the register signal REG, and that the tape reader 54 has been advanced to generate the sychronizing signal TR STROBE and start the read in counter cycle. After the parity count is made, the first and most significant digit in the tape read position is 1 coded as 0001 and it is converted to time series binary form, least significant bit first, by the parallel to serial converter 106.

The converted signal is entered at tape data addend NAND gate 342 in the full adder 108 as the time series binary signal DAIN during RP4 iteration time of the read in counter 118. Since the delay line 103 is clear, no other addend nor augend is admitted with the signal DAIN to the full adder 108. The SUM signal corresponds to the DAIN signal since $0+DAIN=DAIN$.

A 1 bit is therefore entered on the delay line 103 during the first TAS pulse of the RP4 iteration through the read in command gate 298. There are no bits entered during successive phase A clock pulses TAS in the same iteration on the delay line 103. Address gating signal REG is present during word WXB time to permit delay line entry gating on TAS pulses.

If the work table 32 is at the X and Y set zero point, there is no position data entered on the delay line 103 during any of the phase B clock pulses TBS. No information is entered on the delay line during the RP4 iteration in word Y time since the address signal REG is then removed from the read in command gate 298.

The registered X command information is read from the delay line 103 and passed through the resynchronizing and store circuit 310 and recirculated on the delay line 103 through command gate 322 until the next tape numeric character is advanced to the tape read position and the TR STROBE pulse is generated to start a new read in count period. The new read in count is begun synchronously with a new word counter iteration and parity is checked for the new numeric tape character corresponding to the decimal digit 0 during $R1 \cdot \overline{R2}$ time. The registered delay line data is again recirculated during the parity check.

At the start of the next iteration and during RP3 time, the delay line time series signal COM is shifted two binary places in the shift register 110 during WXB word time when the REG signal is generated at the set input of the shift register flip-flop 332. The shift register output signal SF2 is entered as a binary addend signal to the full adder 108 through the double shift gate 246. Simultaneously, the delay line time series signal COM is directly entered to the full adder 108 through the augend command gate 248. The addend SF2 and the augend COM are added to produce a new SUM signal which is re-entered on the delay line 103 through the read in command gate 298 in the same manner as previously described.

The new SUM signal equals 0100 plus 0001 or 0101 which is equal to five times the original digit 1. The least significant bit is entered (FIG. 18A) in the delay line during the first phase A clock pulse TAS in bit time B1, the next 1 bit is registered during the second TA clock pulse, the next 0 bit is entered during the fourth TA clock pulse and the remaining 0 bits are entered on the delay line during subsequent TA clock pulses of word WXB time of the on going iteration. To this point in the new read in count the new tape digit has not been registered since RP4 time has not yet arrived.

The time series binary signal is then read from the delay line 103 as a new COM time series signal and on the next iteration, RP4 time begins and the new COM signal is shifted one binary place in the shift register 110, which is equivalent to a multiplication by decimal 2, thereby to complete the multiplication of the first binary coded digit by ten, and it is entered in the full adder 108 as time series signal SF1 through the augend single shift gate 250. Simultaneously, the second digit 0 is entered as an addend in the tape data gate 242 of the full adder 108.

After addition, the output SUM equals 01010 plus 0000 or 01010 and it is registered in the delay line through the read in command gate 298. At the end of RP4 time, the new delay line data is read as COM and recirculated as previously described until the tape is again advanced to begin a new read in count.

The binary number 01010 is then multiplied by four and added to the product to register binary number 0110010 during RP3 time. During RP4 time, the binary number 0110010 is multiplied by decimal 2 to give binary number 01100100 which is added to the new binary coded digit 1000 corresponding to the decimal digit 8. The resultant binary number 01101100 (FIG. 18B) is recirculated until the next read in count. The process continues until all X word binary coded digits are registered to give binary number 10101001001000 (FIG. 18D). The twentieth binary place has a 0 bit to indicate the plus sign for the X number.

When the word X is registered in Word X time, a similar process is repeated to register word Y in word Y time. For example, Y equals —23735 is recorded in twos complement form as shown in the Y word time in FIG. 18D. In that schematic, the negative number is signified by a carry bit during clock pulse TAS in B20 time.

When both X and Y words are registered, the command data is continuously recirculated on the delay line 103 and the comparison cycle is started by the COMP signal from the tape reader control 112. During comparison time, full adder 108 and the shift register 110 have no effect on the circulation of command data but do play a role in the processing and updating of error and feedback position data. After the workplace is placed in the command position, it is machined according to the auxiliary function commands. Immediately after the machine operation is completed, the tape reader control 112 is restarted automatically or manually by generation of OKTA which leads to the generation of ADTR so that a new tape data block can be registered for a new machine operation.

F. *The comparison cycle—further detail*

The data flow for the comparison cycle is shown in FIG. 4B. When the COMP signal is generated by the tape reader control 112, it is applied to addend and augend NAND compare gates 342 and 344 in the full adder 108, and the other full adder addend and augend gates are disabled during the comparison cycle since the read in counter 118 is stopped. The COMP signal and its complement also go to the shift register 110 in controlling the operation of the flip-flop 330 through the NAND gates 332 and 334 so as to produce the time series binary signal SF2 which is equal to the delay line time series binary signal POS phase shifted by one half of a counter bit time. The delayed position bits are then in phase A time alignment with corresponding command bits for bit by bit comparison in the full adder 108. Comparison is made by ones complement addition to produce SUM as a ones difference error number signal, and the negation of the SF2 signal is therefore added with the COM signal through the addend and augend gates 342 and 344 in the full adder 108. The fact that the position and command data bits are interlaced on the delay line 103 by means of successive and alternate TAS and TBS pulses facilitates the comparison.

Since the generated error data is in the form of a ones difference signal, it is always one bit less than the absolute difference between the command and position numbers. If the command number is less positive than the position number, null is realized when the error number contains all 1 bits. If the command number is more positive than the position number, null is realized when the error number contains all 0 bits. Null can accordingly be approached in a direction toward $X=0$, $Y=0$ in quadrant 1 without a change in sign. That direction is preferably the backlash take up direction. In order to maintain the position data updated as the machine is moved, the POS signal from the command and position store unit 104 also goes directly to the half adder and subtractor 122.

Figure 18A:
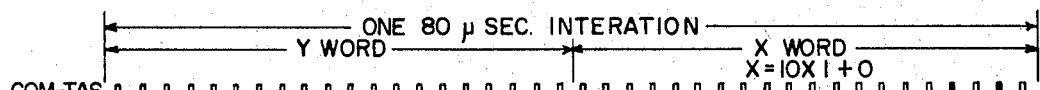
FIGS. 18A–18D show respective dynamic register pulse trains which exist at various stages in the operation of the control system.
Figure 18B:
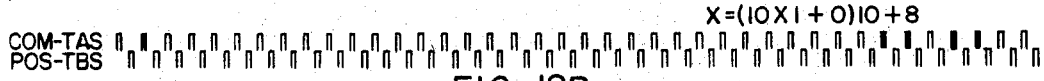
Figure 18C:
Figure 18D:
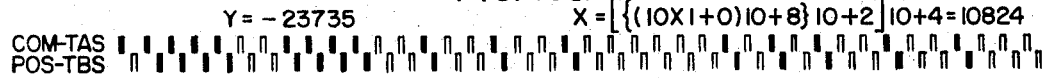

At the start of the comparison cycle, it may be assumed that the machine is at X and Y zero position so that no feedback position information is registered on the delay line 103 as shown in the bottom part of FIGS. 18A, 18B, and 18C. The zero position is set prior to the tape read cycle by switch generation of the master clear set zero signal $\overline{MR}.\overline{SZ}$. At that time, the master clear signal is applied to an input set NAND gate 346 for the flip-flop 316 (FIG. 17) to clear all position data from the delay line 103.

The full adder error signal SUM includes bits entered on TB clock pulses and it is fed to the error detector 124. Depending on the mangitude of the error number, FINE, MEDIUM and COARSE signals are produced in the error detector 124 by fine, medium and coarse memory flip-flops 348, 350 and 352 to control the drive speed at which the machine changes position toward the command position, i.e., slow step motor speed, fast step motor speed, or traverse speed.

The coarse flip-flop 352 is set by a pulse error NAND gate 354 if SUM and a signal CDT from the coarse and medium detector 126 are both logic value 1. By suitable pulse counter decoding, CDT is generated from bit time B11 through bit time B19 so that coarse is generated if an error bit occurs in this time period. If the error number is negative, that is if the command number is less than the position number, the coarse flip-flop 352 is set by a negative error NAND gate 356 in response to $\overline{SUM}$ so as to avoid incorrect setting when a one bit in a coarse bit time is merely indicative of a negative number. An NEG or $\overline{NEG}$ signal is generated during word time WXB or WYB by NAND gates 358, 360 and 362 to control the gates 354 and 356 in response to direction memory signals $\overline{YPDIR}$ and $\overline{XPDIR}$ which are suitably generated in the drive logic 128.

The medium flip-flop 350 is similarly set by positive and negative error NAND gates 364 and 366 if the SUM or $\overline{SUM}$ signal and a signal MDT from the coarse and medium detector 126 are both logic value 1. MDT may be generated from bit time B4 through bit time B9 to generate MEDIUM if an error bit occurs in that time period.

All of the flip-flops 348, 350 and 352 are reset by a reset NAND gate 368 during the TB pulse of A1 time, i.e. at the start of each iteration, so as to assure memory change if the new error number so warrants. However, corresponding memories (not shown) in the drive logic are not reset until the next B20 time and then only if the same memory fails again to be set in the error detector 124 before the next B20 time. The fine flip-flop 348 is also reset on TB pulses by the medium flip-flop 350 if it is set, and the medium flip-flop 350 is reset on TB pulses by the coarse flip-flop 352 if it is set.

The medium flip-flop 350 is also set by an overshoot NAND gate 370 when the machine table is moving in the intentional overshoot direction in response to a positive error number so that medium speed is retained as the table overshoots the command position for a predetermined overshoot distance. Backlash is then taken up in the opposite or no overshoot direction. The $\overline{MILL}$ signal is suitably generated so that the overshoot gate 370 is inoperative during programmed milling. When programmed milling is being performed, MILL is suitably generated, the machine table is automatically moved to a start position, and milling speed is suitably controlled by a potentiometer (not shown) and the operation is brought to a programmed stop when a predetermined position is achieved.

The fine flip-flop 348 is set by $\overline{SUM}$ and provides fine correction in both directions unless it is reset by the medium flip-flop 350. The signal $COMP \cdot \overline{B20} \cdot TA$ assures that none of the flip-flops 348, 350 and 352 will set during bit time B20 which is reserved for a sign bit.

The following logic formulas summarize the operation of the error detector 124:

$$C = [SUM \cdot \overline{NEG} \cdot (COMP \cdot \overline{B20} \cdot TA) \cdot CDT]$$
$$+ [\overline{SUM} \cdot NEG \cdot (COMP \cdot \overline{B20} \cdot TA) \cdot CDT]$$

$$M = [\overline{A1} \cdot \overline{MILL} \cdot COMP \cdot \overline{NEG}]$$
$$+ [SUM \cdot \overline{NEG} \cdot (COMP \cdot \overline{B20} \cdot TA) \cdot MDT]$$
$$+ [\overline{SUM} \cdot NEG \cdot (COMP \cdot \overline{B20} \cdot TA) \cdot MDT]$$

$$F = \overline{SUM} \cdot (COMP \cdot \overline{B20} \cdot TA)$$

In the half adder and subtractor 122, an update memory flip-flop 372 is set to generate CAR2 on TA clock pulses at the beginning of any word time if an X or Y feedback position bit has been generated in the previous word time. CAR2 is connected to the storage unit update gate 324 which is thus gated for operation on the next TB clock pulse of the iteration.

If the feedback bit is positive, the update flip-flop 372 enters a 1 bit on the delay line 103 when a 0 bit first occurs in the POS signal. The update flip-flop 372 is then reset and the positive feedback bit has been added to the re-entering POS signal.

If the feedback bit is negative, the update flip-flop 372 enters a 1 bit on the delay line 103 for every 0 bit in the POS signal until the first occurrence of a 1 bit in the POS signal. A 0 bit is then entered on the delay line 103, the update flip-flop 372 resets, and the negative feedback pulse has been subtracted from the re-entering POS signal. If no feedback bit exists at the start of any word time, the POS signal is simply gated by $\overline{CAR2}$ through the recirculate position gate 326 to the delay line 103.

Feedback pulses are stored in X and Y plus and minus memory flip-flops 374, 376, 378 and 380. Pulse memory reset is made at the end of word time WYB or WXB if one of the memories has previously been set for the signal CAR1 to be generated. A carry flip-flop 382 generates CAR1 and sets the update flip-flop 372 on a TA clock pulse if it has been set on the previous TB clock pulse at the beginning of X or Y word time. The carry flip-flop 382 is set at that time by NAND gates 384 and 386 only if an X or Y pulse memory has been set as indicated by the set gate processing of negation signals from the X and Y memories 374, 376, 378 and 380.

The carry flip-flop 382 and the update flip-flop 372 are reset after the TB clock pulse occurs during the last phase A bit time A20 in each word time if an X or Y feedback pulse had been generated in that word time. The flip-flops 372 and 382 are also reset by a sign memory flip-flop 388 through an add NAND gate 390 or a subtract NAND gate 392 at the appropriate bit time according to whether addition or subtraction is being performed. The NAND gates 390 and 392 are operated on TB clock pulses for the same reason the set gates 384 and 386 are. The sign memory flip-flop 388 is set after a positive X or Y pulse occurs and during TB pulse time at the end of the previous word time, i.e. $WYA \cdot A20 \cdot TB$ or $WXA \cdot A20 \cdot TB$. If set, the sign flip-flop 388 is reset by a reset NAND gate 394 during TB pulse time and end of word bit time A20.

When the sign flip-flop 388 is set, the add gate 390 is operative in TB pulse time during time $\overline{A20}$ and during the first one bit in $\overline{POS}$ (i.e., the first 0 bit in POS) to reset the carry flip-flop 382. The update flip-flop 372 then is reset on the next TA clock pulse and before the next POS bit occurs in phase B clock time. Similarly, when the sign flip-flop 388 is reset, the subtraction gate 392 is operative in TB pulse time during $\overline{A20}$ time and during the first 1 bit in POS to reset the carry and update flip-flops 382 and 372. The updating of position data is thus efficiently obtained for properly timed reentry of the data onto the delay line 103 from which it is read for error detection as the comparison cycle continues until zero X and Y error is recorded as illustrated in FIG. 18D.

G. *Significant data pertaining to sample product*

| | |
|---|---|
| Type of machine | 4 spindle drilling machine. |
| Axis control | X and Y. |
| Number of auxiliary functions | 80. |
| Type of number processing logic | NAND, with minor exceptions. |
| Type of processing logic components | Molecular NAND blocks: Flip-flop memories and NAND gates with switching time of about 20 nanoseconds. |
| Number of molecular logic blocks in number processing logic | About 200. |
| Number of conventional components in number processing logic | About 200. |
| Register time length | 80 microseconds. |
| Clock system | 2 phase; alternate phase A and B pulses at rate of 1 million/sec. |
| Register capacity | 80 bits. |
| Maximum X or Y command position number | $\pm 524287 = \pm(2^{19}-1)$. |
| Size of enclosed number processing logic package | Less than 1 ft.$^3$. |
| Size of total control package | Wall mounted 30" x 22" x 13"; floor console size as required. |
| Cooling employed for logic package | None, except internal air circulation to reduce hot spots. |
| Approximate allowable maximum rate of feedback position bit generation | 4,200 bits/sec. |
| Distance represented by position bit | .001". |
| Tape read speed | 20 characters/sec. |
| Traverse drive speed | 500 in./min. |

IV. SUMMARY

In summary of the invention, a novel system combination of elements is provided to produce improved machine tool control performance. Command and position data is efficiently processed and registered under multiphase clock timing in producing fast and accurate position-to-position control. The multiphase clock multiplexes the command and position data into an economic dynamic binary serial storage register.

The fact that fast switching time molecular logic is cooperatively combined with the multiphase clock system permits circuit time sharing in certain parts of the processing logic and further allows the multiplexing registration process to be realized with relatively large register storage capacity. Thus, special incremental benefits are achieved in the sense that a relatively reduced number of components and a relatively reduced digital processing and storage logic package size are realized. Manufacturing economy and reliability and economy in use are therefore incrementally improved.

With the preferred employment of NAND logic blocks, better reliability is generally realized. A multiphase clock makes the employment of NAND logic economic in the sense that special circuits are not required to avoid timing problems, and extra components and added unreliability are therefore avoided.

It is also noteworthy that the employment of molecular logic circuitry results in the usual general benefits of small size, relatively large logic capacity for a given package size, a relatively small number of components, low power consumption and negligible cooling needs. The usual economy and reliability associated with these benefits is therefore inherent to the machine tool control system. The fact that logic circuit cooling needs are low, permits encasement of the digital logic package without special cooling thereby permitting ready elimination of random noise switching.

The following table is presented as a summary outline of the clock system operation:

CLOCK SYSTEM FUNCTION TABLE

| System unit placed under clock control | Signal(s) used | Purpose |
|---|---|---|
| Tape reader control. | WYA·A20 | End of tape block turn off. |
| Read in counter | WYB·B20·TA; TB. | Synchronize tape read cycle with counter iterations and define read in count periods starting with WXB time. |
| Parity detector | R1·$\overline{R2}$ and others not designated. | Timed control of parity count. |
| Converter | B1, B2, B3, B4 | Convert parallel BCD to series BCD. |
| Sign and word store. | WXB·RP4; WYB·RP4. | Timed clearance of command data from delay line. |
| | TB | Increase signal to noise ratio. |
| | RP4 | Reduces length of sign memory set time before numbers are registered. |
| | WXB·WYB | Gating to generate word register signal for delay line. |
| Full adder | RP3; RP4 | Addend and augend gating for duration of iteration. |
| | TA·$\overline{B20}$; WYB·B20·TA·RP4; WXB·B20·TA·RP3; TA·B20; $\overline{B20}$; TB. | Carry memory gating for entry of carry in TA time. |
| Shift register | WXB·B20·TA; WYB·B20·TA. | Remove drive direction memory preset. |
| | TA, TB | Gating to shift data bits from phase to phase or place to place. |
| Command and position store. | TBS, TAS | Multiplex gating, storing and resynchronizing. |
| Half adder | WYB·B20·TA; WXB·B20·TA. | Pulse memory reset at beginning of word time. |
| | WYA·A20; WXA·A20; TA; TB; A20; $\overline{A20}$. | Gating of carry set on TA before first TB; gating of carry reset on TA after TB in which addition or subtraction completed. |
| Error detector | Comp·$\overline{B20}$·TA | Prevent memory set during sign bit time. |
| | TB | Memory reset. |
| | WYB; WXB | Word time gating for generation of sign of error number. |
| | $\overline{A1}$ | Gate overshoot set of M memory. |
| | A1 | Memory reset at start of iteration. |
| Coarse and medium detector. | Various bit times | Gating of error detector according to error number size. |

In addition, in all system circuit units where successive logic memory stages are clocked by TA and TB clock pulses and where the same scheme is used between memory stages of interconnected system units, racing is conveniently avoided without added logic circuitry which normally would be required in similar logic controls if a single phase clock were used.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A numerical machine tool control system comprising a dynamic binary serial storage register, a multiphase iterative clock system having at least two pulse outputs in separate phases, means for generating binary position command data in binary word form for at least one position axis in response to successive pulses of one of the clock phases, means for writing the command word bits in said register during successive pulses of another clock phase and during an iteration, means for recirculating the command word in said register during successive iterations, means for generating feedback position data for the position axis in algebraically updated word form and in response to successive pulses of one of the clock phases, means for repeatedly writing the feedback position word bits in said register within successive iterations and during successive pulses of a clock phase different from said other clock phase and different from the clock phase used for said feedback generating means, and means for comparing corresponding bits of the command and feedback position words in a common phase time.

2. A numerical machine tool control system as set forth in claim 1, wherein at least some of said means include logic circuitry formed with a plurality of molecular logic blocks to perform the indicated circuit functions in response to pulses generated by said clock system.

3. A numerical machine tool control system as set forth in claim 1, wherein all of said means include logic circuitry formed with a plurality of molecular logic blocks to perform the indicated circuit functions in response to pulses generated by said clock system.

4. A numerical machine tool control system as set forth in claim 2, wherein NAND molecular logic blocks are employed and wherein said binary serial storage register is a sonic delay line.

5. A numerical machine tool control system comprising a dynamic binary serial storage register, a multiphase iterative clock system having at least two pulse outputs in separate phases, means for generating position command data for at least one position axis in the form of time series binary coded digits and in response to successive pulses of a first clock phase, means for converting the binary coded digits to a binary position command word during successive iterations, means for writing the command data in said register during successive pulses of another clock phase and during the conversion process, means for recirculating the command word in said register during subsequent iterations with word bits entered during successive pulses of said other clock phase means for generating feedback position data for the position axis in algebraically updated word form and in response to successive pulses of said other clock phase, means for repeatedly writing the feedback position word bits in said register within successive iterations and during successive pulses of said first clock phase, and means for comparing corresponding bits of the command and feedback position words in a common phase time.

6. A numerical machining tool control system comprising a binary serial storage register, a multiphase iterative clock system having at least two pulse outputs in separate phases, means for generating position command data for at least one position axis in the form of time series binary coded digits and in response to successive pulses of a first clock phase, a shift register and a full adder formed with molecular logic blocks to convert the binary coded digits to a binary position command word during successive clock iterations, means for writing command data from said adder in said register during successive pulses of another clock phase and during the conversion process, means for recirculating the command word in said register during subsequent clock iterations with word bits entered during successive pulses of said other phase, means for generating feedback position data for the position axis in algebraically updated word form and in response to successive pulses of said other clock phase, means for repeatedly writing the feedback position word bits in said register within successive clock iterations and during successive pulses of said first first clock phase, and means for comparing corresponding bits of the command and feedback position words in a common phase time.

7. A numerical machine tool control system as set forth in claim 6 wherein said molecular logic blocks are provided in NAND form and at least some of said means include logic circuitry formed with a plurality of NAND molecular logic blocks to pulses generated by said clock system to perform the indicated circuit functions in response.

8. A numerical machine tool control system comprising a binary serial storage register, a multiphase iterative clock system having at least two pulse outputs in separate phases, means for generating position command data for at least one position axis in the form of time parallel binary coded digits occurring in time series, means for successively converting the time parallel binary coded digits to time series binary coded digits in response to successive pulses of a first clock phase, means for synchronizing said generating means with said clock system so that each time series binary coded digit is generated with binary bits in predetermined successive iteration bit times, means for converting the time series binary coded digits to a binary position command word during successive iterations, means for writing the command data in said register during successive pulses of another clock phase and during the conversion process, means for recirculating the command word in said register during subsequent clock iterations with word bits entered during successive pulses of said other clock phase, means for generating feedback position data for the position axis in algebraically updated word form and in response to successive pulses of said other clock phase, means for repeatedly writing the feedback position word bits in said register within successive iterations and during successive pulses of said first clock phase, and means for comparing corresponding bits of the command and feedback position words in a common phase time.

9. A numerical machine tool control system as set forth in claim 8 where the second mentioned converting means includes a shift register and a full adder formed with molecular logic blocks, and said register is in the form of a sonic delay line.

10. A numerical machine tool control system comprising a sonic delay line register, a multiphase iterative clock system having at least two pulse outputs in separate phases, means for generating position command data for at least one position axis in the form of time parallel binary coded digits occurring in time series, means for successively converting the time parallel binary coded digits to time series binary coded digits in response to successive pulses of a first clock phase, a read in counter responsive to said clock system and to a synchronizing signal from said generating means to generate successive count signals at the start of predetermined successive clock iterations, means responsive to the read in counter signals for converting the binary coded digits to a binary position command word during successive iterations, means for writing the command data on said delay line during successive pulses of another clock phase and during the conversion process, means for recirculating the command word on said delay line during subsequent iterations with word bits entered during successive pulses of said other clock phase, means for generating feedback position data for the position axis in algebraically updated word form and in response to successive pulses of said other clock phase, means for repeatedly writing the feedback position word bits on said delay line within successive clock iterations and during successive pulses of said first clock phases, and means for comparing corresponding bits of the command and feedback position words in a common phase time.

11. A numerical machine tool control system as set forth in claim 10 wherein said read in counter and each of said means include logic circuitry formed with molecular logic blocks to perform the indicated circuit functions in response to pulses generated by said clock system.

12. A numerical machine tool control system as set forth in claim 10, wherein said generating means generate position command data for at least two position axes with each set of axial data in the form of time parallel binary coded digits occurring in time series, the first and second mentioned converting means converts the respective sets of binary coded digits to respective binary position command words during respectively separate portions of successive clock iterations, the second mentioned converting means further includes an address register responsive to said generating means and said clock system to gate the respective sets of command data onto said delay line during respective predetermined time span portions of the iterations.

13. A numerical machine tool control system comprising a binary serial storage register, a multiphase iterative clock system having at least two pulse outputs in separate phases, means for generating binary position command data in binary word form for at least one position axis and in response to successive pulses of one of the clock phases, means for writing the command word bits in said register during sucessive pulses of another clock phase and during an iteration, means for recirculating the command word in said register during successive iterations, means for generating feedback position change bits for the position axis, means for writing feedback position bits in said register in word form in sucessive iterations during successive pulses of a clock phase different from said other clock phase, means for reading position bits from said register, a half adder and subtractor responsive to said position bit reading means and said feedback generating means and cooperative with said feedback position writing means repeatedly to update the feedback position word during successive iterations, and means for comparing corresponding bits of the command and feedback position words in a common phase time.

14. A numerical machine tool control system as set forth in claim 13 wherein each of said means and said half adder and subtractor include logic circuitry formed with molecular logic blocks to perform the indicated circuit functions in response to pulses generated by said clock system.

15. A numerical machine tool control system comprising a binary serial storage register, a multiphase iterative clock system having at least two pulses outputs in separate phases, means for generating binary position command data in binary word form for at least one position axis and in response to successive pulses of one of the clock phases, means for writing the command word bits in said register during successive pulses of another clock phase and during a clock iteration, means for recirculating the command word in said register during successive iterations, means for generating feedback position data for the position axis in algebraically updated word form and in response to successive pulses of one of the clock phases, means for repeatedly writing the feedback position word bits in said register within successive iterations and during successive pulses of a clock phase different from said other clock phase and different from the clock phase used for said feedback generating means, means for comparing corresponding bits of the command and feedback position words in a common phase time so as to generate an error number, said comparing means including an error detector responsive to pulses generated by said clock system and to the generated error number so as to generate signals indicative of the error magnitude and thereby control the rate of position change.

16. A numerical machine tool control system comprising a sonic delay line register, a multiphase iterative clock system having at least two pulse outputs in separate phases, means for generating position command data for at least one position axis in the form of time prallel binary coded digits occurring in time series, means for successively converting the time parallel binary coded digits to time series binary coded digits in response to successive pulses of a first clock phase, means for synchronizing said generating means with said clock system so that each time series binary coded digit is generated with binary bits in predetermined successive iteration bit times, means for converting the time series binary coded digits to a binary position command word during successive iterations, said converting means including a shift register and a full added for performing the arithmetic operations necessary to the conversion process, means for writing the command data on said delay line during successive pulses of another clock phase and during the conversion process, means for recirculating the command word on said delay line during subsequent clock iterations with word bits entered during successive pulses of said other clock phase, means for generating feedback position data for the position axis in algebraically updated word form and in response to successive pulses of said other clock phase, means for repeatedly writing the feedback position word bits on said delay line within successive iterations and during successive pulses of said first clock phase, and means including said shift register and said full added for comparing corresponding bits of the command feedback position words in a common phase time.

17. A numerical machine tool control system comprising a sonic delay line register, a multiphase iterative clock system having at least two pulse outputs in separate phases, means for generating position command data for at least one position axis in the form of time parallel binary coded digits occurring in time series, means for successively converting the time parallel binary coded digits to time series binary coded digits in response to successive pulses of a first clock phase, means for synchronizing said generating means with said clock system so that each time series binary coded digit is generated with binary bits in predetermined successive iteration bit times, means for converting the time series binary coded digits to a binary position command word during successive interations, said converting means including a shift register and a full adder for performing the arithmetic operations necessary to the conversion process, means for writing the command data on said delay line during successive pulses of another clock phase and during the conversion process, means for recirculating the command word on said delay line during subsequent clock iterations with word bits entered during successive pulses of said other clock phase, means for generating feedback position change bits for the position axis, means for writing feedback position bits on said delay line in word form in successive iterations during successive pulses of said first clock phase, means for reading position bits from said delay line, a half adder and subtractor responsive to said position bit reading means and said feedback generating means and cooperative with said feedback position writing means repeatedly to update the feedback position word during successive iterations, and means including said shift register and said full adder for comparing corresponding bits of the command and feedback position words in a common phase time, said full adder responsive to said shift register and to said recirculating means during the second conversion and the comparison processes, said shift register responsive to said position bit reading means during the comparison process and responsive to said recirculating means during the second conversion process.

18. A numerical machine tool control system comprising a sonic delay line register, a multiphase iterative clock system having at least two pulse outputs in separate phases, means for generating position command data for at least one position axis in the form of time parallel binary coded digits occurring in time series, means for successively converting the time parallel binary coded digits to time series binary coded digits in response to successive pulses of a first clock phase, a read in counter responsive to said clock system and to a synchronizing signal from said generating means to generate successive count signals at the start of predetermined successive clock iterations, means responsive to the read in counter signals for converting the binary coded digits to a binary position command word during successive iterations, means for writing the command data on said delay line during successive pulse of another clock phase and during the conversion process, means for recirculating the command word on said delay line during subsequent iterations with word bits entered during successive pulses of said other clock phase, means for generating feedback position change bits for the position axis, means for writting feedback position bits on said delay line in word form in successive iterations during successive pulses of said first clock phase, means for reading position bits from said delay line, a half adder and subtractor responsive to said position bit reading means and said feedback generating means and cooperative with said feedback position writing means repeatedly to update the feedback position word during successive iterations, means for comparing corresponding bits of the command and feedback position words in a common phase time, a shift register and a full adder commonly included in the second mentioned converting means and said comparing means and responsive to pulses generated by said clock system to perform the indicated circuit functions during the conversion and comparison processes, and at least both of said delay line writing means and said position bit reading means and said recirculating means and said shift register and said full adder and said half adder and subtractor including logic circuitry formed with molecular logic blocks.

19. A numerical machine control system as set forth in claim 18 wherein said generating means generate position command data for at least two position axes with each set of axial data in the form of time parallel binary coded digits occurring in time series, the first mentioned converting means converts the respective sets of time parallel binary coded digits to respective sets of time series binary coded digits generated with binary bits in predetermined successive iteration bit times to form respective position command words, the second mentioned converting means includes an address register responsive to said generating means and said clock system to gate the respective position command words onto said delay line during respective predetermined time span portions of the clock iterations.

References Cited

UNITED STATES PATENTS

| | | | |
|---|---|---|---|
| 3,079,522 | 2/1963 | McGarrell | 235—151.11 X |
| 3,246,129 | 4/1966 | McKeluie | 235—151.11 |
| 3,308,279 | 3/1967 | Kelling | 235—151.11 |

MARTIN P. HARTMAN, *Primary Examiner.*

J. F. RUGGIERO, *Assistant Examiner.*

U.S. Cl. X.R.

318—18